(12) United States Patent
Isozaki et al.

(10) Patent No.: US 6,950,603 B1
(45) Date of Patent: Sep. 27, 2005

(54) DIGITAL SIGNAL, PROCESSING APPARATUS, DIGITAL SIGNAL PROCESSING METHOD, DIGITAL SIGNAL RECORDING APPARATUS, DIGITAL SIGNAL REPRODUCING APPARATUS, AND DIGITAL VIDEO-AUDIO SIGNAL RECORDING AND REPRODUCING APPARATUS

(75) Inventors: Masaaki Isozaki, Kanagawa (JP); Kenji Yamasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/431,752

(22) Filed: Nov. 1, 1999

(30) Foreign Application Priority Data

Nov. 2, 1998 (JP) .................................. 10-312056

(51) Int. Cl.[7] .............................................. H04N 5/91
(52) U.S. Cl. ........................ 386/95; 386/96; 386/104; 360/22
(58) Field of Search ................... 386/104, 68, 109–112, 386/96, 95; 360/22, 29, 32, 40, 49

(56) References Cited

U.S. PATENT DOCUMENTS 4,914,527 A * 4/1990 Asai et al. ..................... 386/95
5,424,879 A * 6/1995 Yamada et al. ................ 386/96

FOREIGN PATENT DOCUMENTS

| EP | 0 600 496 | 6/1994 | |
|---|---|---|---|
| EP | 0 649 136 | 4/1995 | |
| EP | 000697699 A2 * | 2/1996 | ........... G11B 27/32 |
| EP | 0 851 689 | 7/1998 | |

* cited by examiner

Primary Examiner—Vincent Boccio
(74) Attorney, Agent, or Firm—Frommer Lawrence & Haug LLP; William S. Frommer

(57) ABSTRACT

The present invention is to provide a digital video-audio signal recording and reproducing apparatus that allows the number of channels of audio data and the data width per sample to be changed corresponding to user's settings. 24-bit/sample audio data that is input as serial data to Ch 1 of the digital video-audio signal recording and reproducing apparatus is separated into high order 16 bits and low order eight bits. The high order 16 bits are recorded in a region of Ch 1 of a record medium. The low order eight bits are stored to a region of low order eight bits of Ch 3 paired with Ch 1 of the record medium. Mode information that represents that 24-bit data is separated into paired channels is added to record data each edit unit of video data. When dat is reproduced, data of paired channels is combined corresponding to the mode information so as to restore 24-bit data. Since the 24-bit data is treated as 16-bit data, the record format of 16-bit data can be used for the 24-bit data.

25 Claims, 21 Drawing Sheets

| AUX0 | AUDIO EDIT, | 2 BITS | 00:NO EDIT POINT IS FOLLOWED BY AND PRECEDED BY CURRENT FIELD. |
| | | | 10:EDIT POINT IS FOLLOWED BYCURRENT FIELD (IN POINT) |
| | | | 01:EDIT POINT IS PRECEDED BY CURRENT FIELD (OUT POINT) |
| | | | 11:EDIT POINTS ARE FOLLOWED BY AND PRECEDED BY CURRENT FIELD |
| | BIT LENGTH, | 1 BIT | 0:16 BITS, 1:24 BITS |
| | DATA/AUDIO, | 1 BIT | 0:AUDIO, 1:DATA |
| | AUDIO MODE, | 2 BITS | 00:INDEPENDENT CH 48k |
| | | | 01:CH PAIRED (32 BITS, 48BITS DATA/96k SAMPLING) |
| | | | 10:CH PAIRED (16 BIT→24BIT AUDIO) |
| | | | 11:RESERVED |
| | FS | 2 BITS | 48k(00),44.1k(01),32k(10),96k(11) |
| | Reserved | 8 BITS | |
| | Reserved | 8 BITS | (24 BITS, AUDIO MODE) |
| AUX1 | Reserved | 8 BITS | |
| | Reserved | 8 BITS | |
| | Reserved | 8 BITS | (24 BITS, AUDIO MODE) |
| AUX2 | LINE MODE | 2 BITS | 00 : 480,01:720,10:1080,11:reserved |
| | Rate | 2 BITS | |
| | Scan | 1 BIT | 0 : Interlaced, 1: Progressive |
| | Freq | 3 BITS | 00 : 23.976Hz |
| | Reserved | 8 BITS | |
| | Reserved | 8 BITS | (24 BITS, AUDIO MODE) |

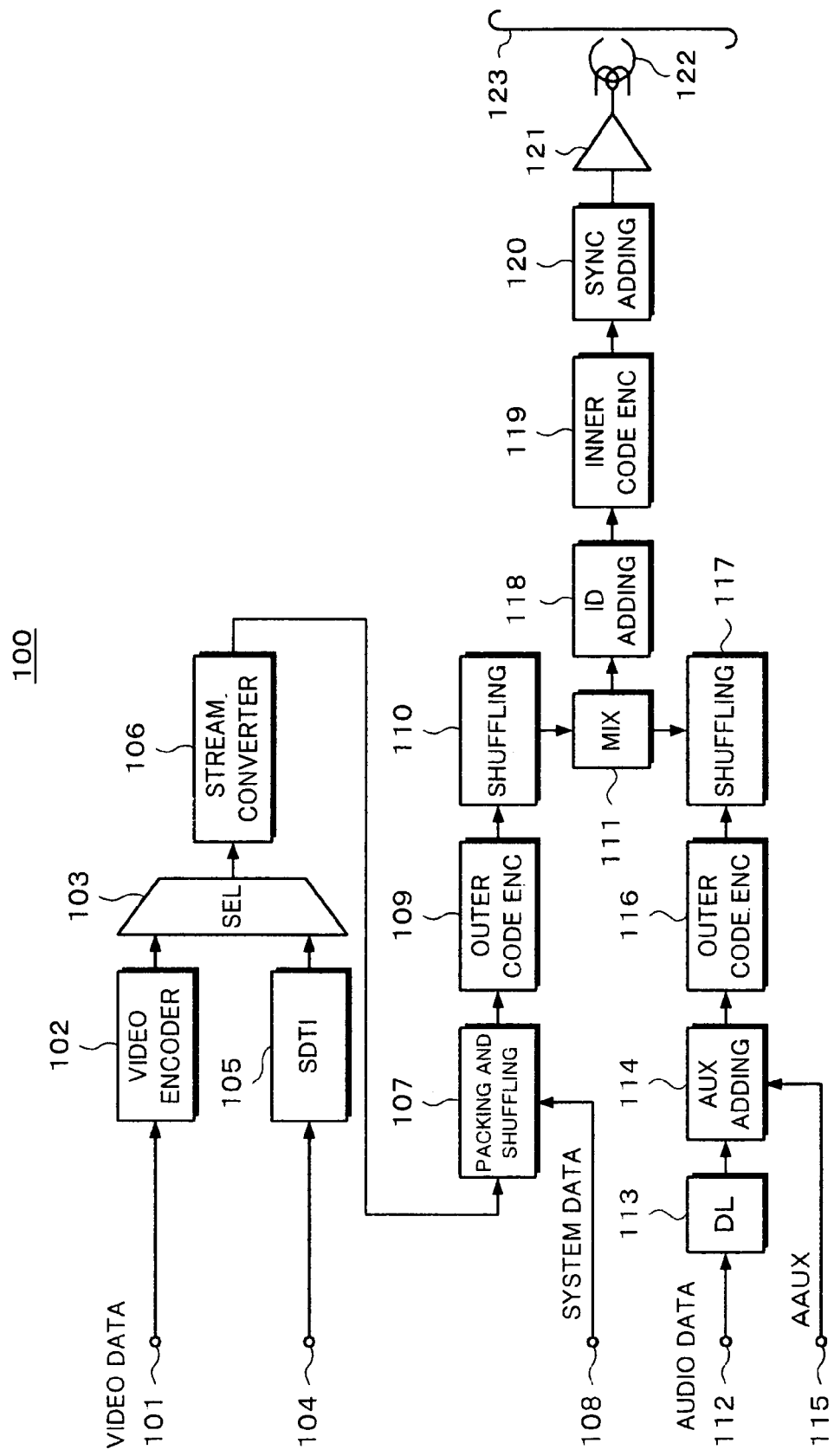

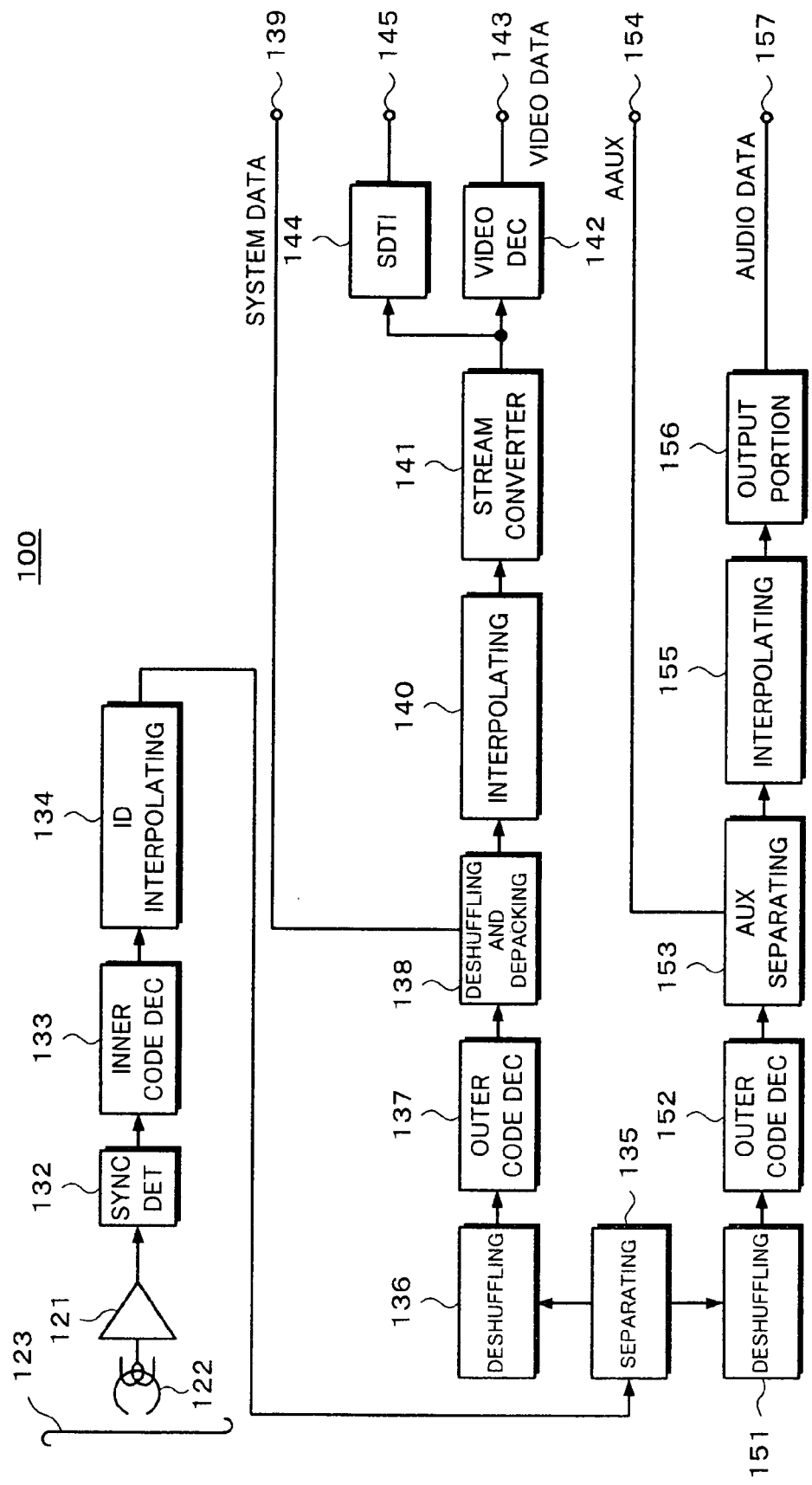

○ : AUDIO SAMPLE DATA WITHOUT ERROR
● : AUDIO DATA OF WHICH ERROR INTERPOLATING PROCESS HAS BEEN PERFORMED

Fig. 9A
| MSB | ID0 | ID1 |
|---|---|---|
| 7 | SYNC ID7 | Upper/Lower |
| 6 | SYNC ID6 | (Reserrvel) |
| 5 | SYNC ID5 | SEG NB3 |
| 4 | SYNC ID4 | SEG NB2 |
| 3 | SYNC ID3 | SEG NB1 |
| 2 | SYNC ID2 | SEG NB0 |
| 1 | SYNC ID1 | TRACK |
| 0 | SYNC ID0 | VIDEO/AUDIO |
LSB
Fig. 9B
DID(VIDEO)
| (Reserrvel) |
|---|
| (Reserrvel) |
| (Reserrvel) |
| (Reserrvel) |
| PAYLOAD MD1 |
| PAYLOAD MD0 |
| 2MB/1MB |
| Vouter |
Fig. 9C
DID(AUDIO)
| (Reserrvel) |
|---|
| (Reserrvel) |
| (Reserrvel) |
| (Reserrvel) |
| DATA/AUDIO |
| 5F Seg2 |
| 5F Seg1 |
| 5F Seg0 |
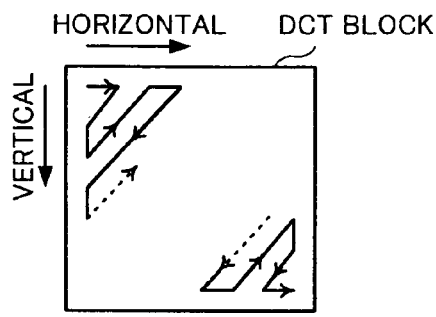
Fig. 10A
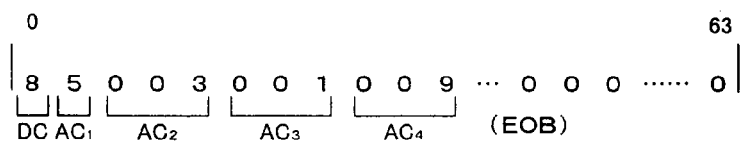
Fig. 10B

Left table (SYNC BLOCK SAMPLE NUMBER):

| OUTER CODE NUMBER | 1 | 2 | 3 | 4 | ... | 61 |
|---|---|---|---|---|---|---|
| 0 | AUX0 | 10 | 26 | 42 | ... | 954 |
| 2 | AUX1 | 12 | 28 | 44 | ... | 956 |
| 4 | AUX2 | 14 | 30 | 46 | ... | 958 |
| 6 | 0 | 16 | 32 | 48 | ... | (958) |
| 8 | 2 | 18 | 34 | 50 | ... | (958) |
| 10 | 4 | 20 | 36 | 52 | ... | (958) |
| 12 | 6 | 22 | 38 | 54 | ... | (958) |
| 14 | 8 | 24 | 40 | 56 | ... | PV0 |
| 16 | PV0 | PV0 | PV0 | PV0 | ... | PV1 |
| 18 | PV1 | PV1 | PV1 | PV1 | ... | PV2 |
| 20 | PV2 | PV2 | PV2 | PV2 | ... | PV3 |
| 22 | PV3 | PV3 | PV3 | PV3 | ... | PV4 |
| 24 | PV4 | PV4 | PV4 | PV4 | ... | PV5 |
| 26 | PV5 | PV5 | PV5 | PV5 | ... | PV6 |
| 28 | PV6 | PV6 | PV6 | PV6 | ... | PV7 |
| 30 | PV7 | PV7 | PV7 | PV7 | ... | PV8 |
| 32 | PV8 | PV8 | PV8 | PV8 | ... | PV9 |
| 34 | PV9 | PV9 | PV9 | PV9 | ... | PV9 |

980 SAMPLES PER FIELD

Right table:

| | 1 | 2 | 3 | 4 | ... | 61 |
|---|---|---|---|---|---|---|
| 1 | AUX0 | 11 | 27 | 43 | ... | 955 |
| 3 | AUX1 | 13 | 29 | 45 | ... | 957 |
| 5 | AUX2 | 15 | 31 | 47 | ... | 959 |
| 7 | 1 | 17 | 33 | 49 | ... | (959) |
| 9 | 3 | 19 | 35 | 51 | ... | (959) |
| 11 | 5 | 21 | 37 | 53 | ... | (959) |
| 13 | 7 | 23 | 39 | 55 | ... | (959) |
| 15 | 9 | 25 | 41 | 57 | ... | PV0 |
| 17 | PV0 | PV0 | PV0 | PV0 | ... | PV1 |
| 19 | PV1 | PV1 | PV1 | PV1 | ... | PV2 |
| 21 | PV2 | PV2 | PV2 | PV2 | ... | PV3 |
| 23 | PV3 | PV3 | PV3 | PV3 | ... | PV4 |
| 25 | PV4 | PV4 | PV4 | PV4 | ... | PV5 |
| 27 | PV5 | PV5 | PV5 | PV5 | ... | PV6 |
| 29 | PV6 | PV6 | PV6 | PV6 | ... | PV7 |
| 31 | PV7 | PV7 | PV7 | PV7 | ... | PV8 |
| 33 | PV8 | PV8 | PV8 | PV8 | ... | PV9 |
| 35 | PV9 | PV9 | PV9 | PV9 | ... | PV9 |

Fig. 15A

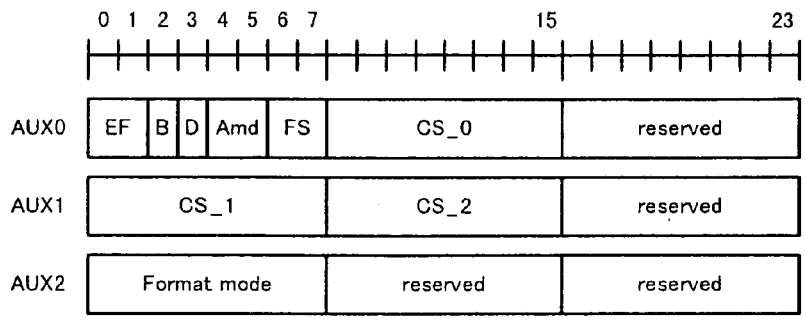

Fig. 15B

| AUX0 | AUDIO EDIT, | 2 BITS | 00:NO EDIT POINT IS FOLLOWED BY AND PRECEDED BY CURRENT FIELD. |
| --- | --- | --- | --- |
| | | | 10:EDIT POINT IS FOLLOWED BY CURRENT FIELD (IN POINT) |
| | | | 01:EDIT POINT IS PRECEDED BY CURRENT FIELD (OUT POINT) |
| | | | 11:EDIT POINTS ARE FOLLOWED BY AND PRECEDED BY CURRENT FIELD |
| | BIT LENGTH, | 1 BIT | 0:16 BITS, 1:24 BITS |
| | DATA/AUDIO, | 1 BIT | 0:AUDIO, 1:DATA |
| | AUDIO MODE, | 2 BITS | 00:INDEPENDENT CH 48k |
| | | | 01:CH PAIRED (32 BITS, 48BITS DATA/96k SAMPLING) |
| | | | 10:CH PAIRED (16 BIT→24BIT AUDIO) |
| | | | 11:RESERVED |
| | FS | 2 BITS | 48k(00),44.1k(01),32k(10),96k(11) |
| | Reserved | 8 BITS | |
| | Reserved | 8 BITS | (24 BITS, AUDIO MODE) |
| AUX1 | Reserved | 8 BITS | |
| | Reserved | 8 BITS | |
| | Reserved | 8 BITS | (24 BITS, AUDIO MODE) |
| AUX2 | LINE MODE | 2 BITS | 00 : 480,01:720,10:1080,11:reserved |
| | Rate | 2 BITS | |
| | Scan | 1 BIT | 0 : Interlaced, 1: Progressive |
| | Freq | 3 BITS | 00 : 23.976Hz |
| | Reserved | 8 BITS | |
| | Reserved | 8 BITS | (24 BITS, AUDIO MODE) |

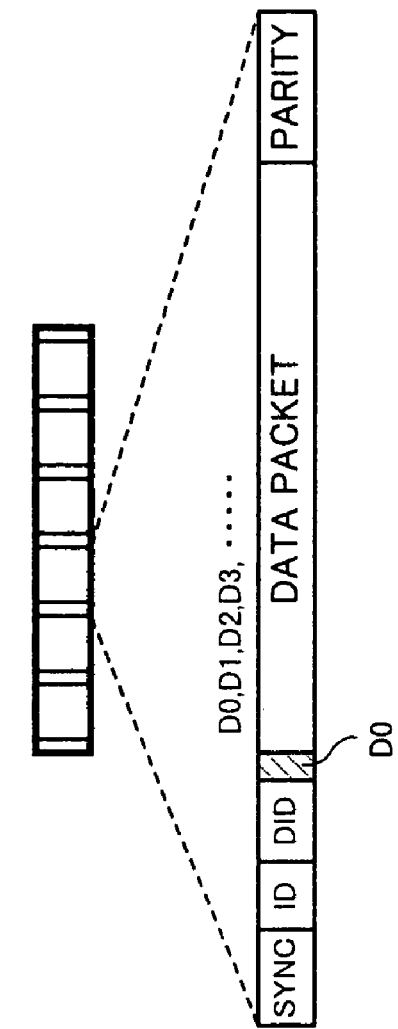
*Fig. 16A*
*Fig. 16B*
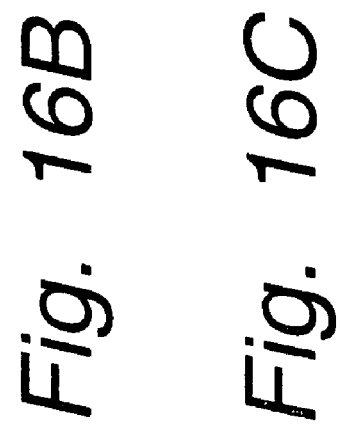
*Fig. 16C*

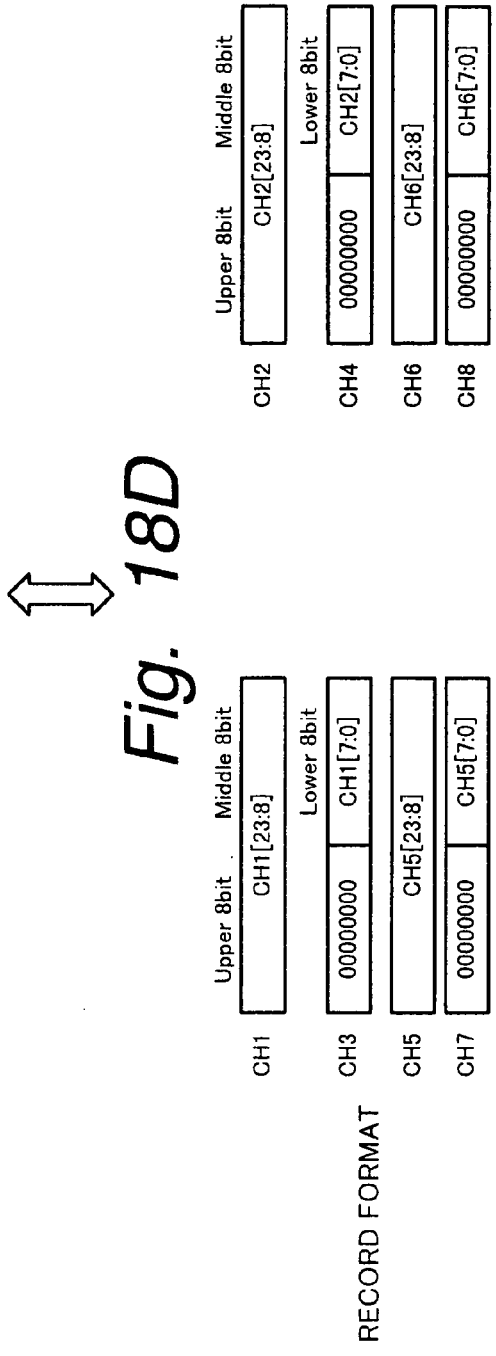

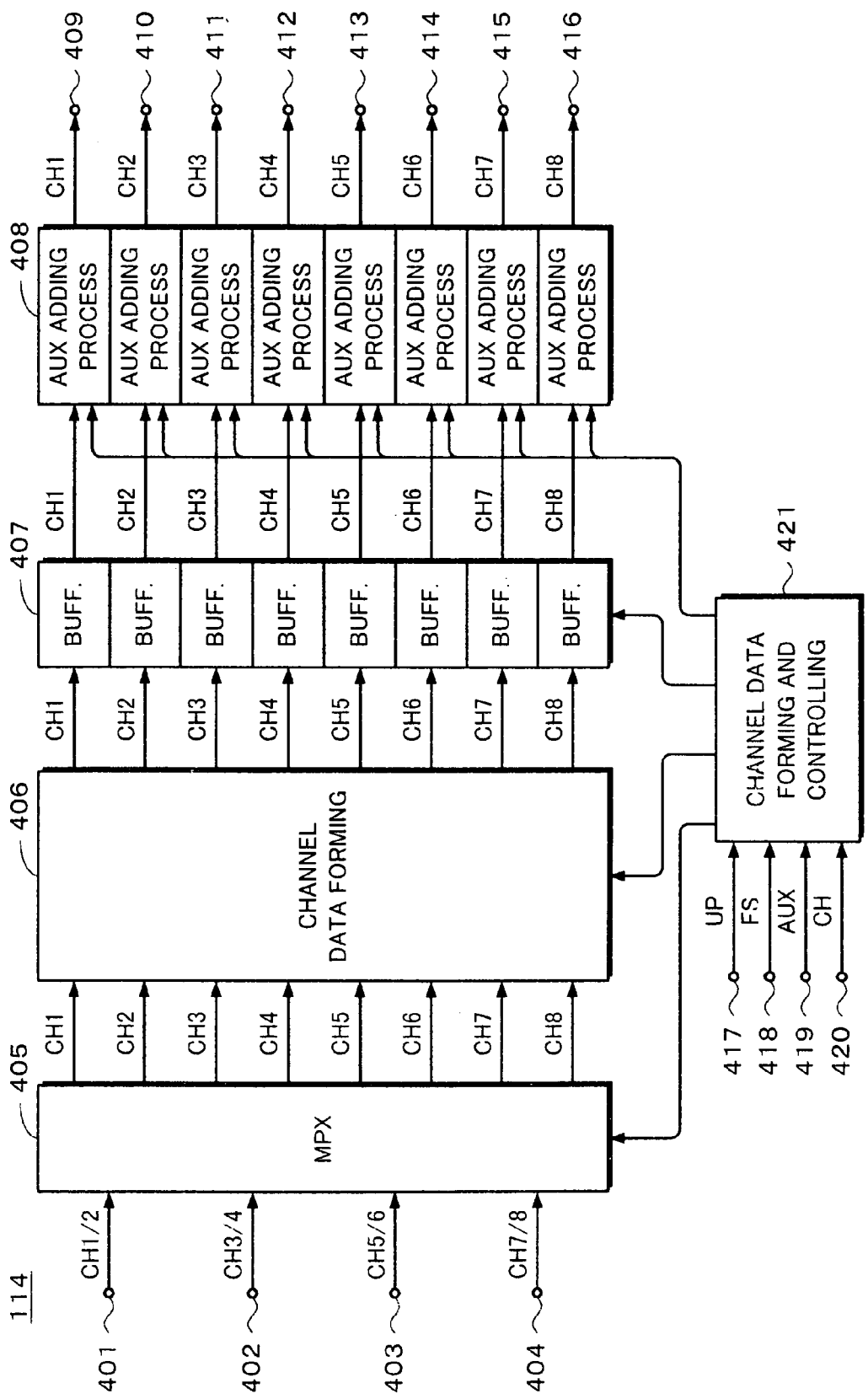

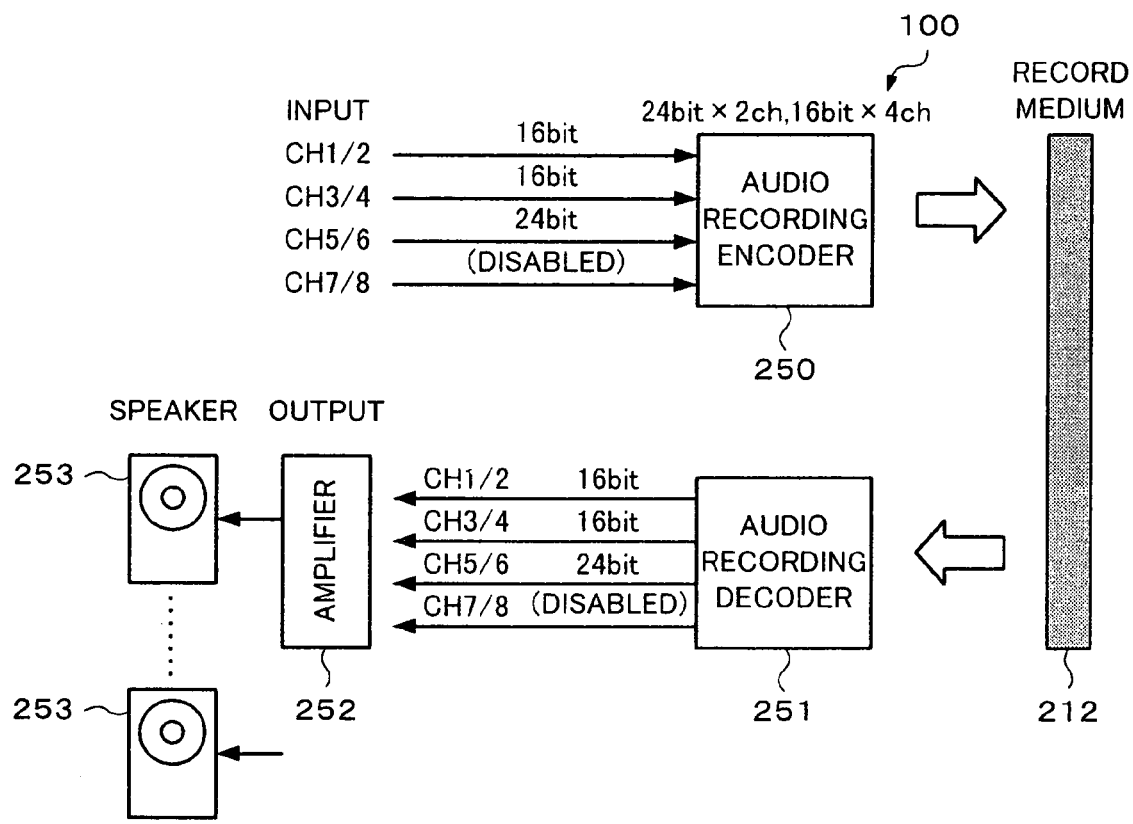

Fig. 23A 16 bit × 8ch
16-BIT AUDIO

| Middle 8bit | Upper 8bit |
|---|---|
| AUDIO 1 | AUDIO 2 |

Fig. 23B 16-BIT DATA

| Middle 8bit | Upper 8bit |
|---|---|
| DATA 0 | DATA 1 |

Fig. 23C 32-BIT DATA (CHS 1-3, 2-4, 5-7, 6-8)

| Middle 8bit | Upper 8bit | |
|---|---|---|
| DATA 0 | DATA 1 | (CH1, 2, 5, 6) |
| DATA 2 | DATA 3 | (CH3, 4, 7, 8) |

Fig. 23D 24-BIT AUDIO (CHS 1-3, 2-4, 5-7, 6-8)

| Middle 8bit | Upper 8bit | |
|---|---|---|
| AUDIO 1 | AUDIO 2 | (CH1, 2, 5, 6) |
| Lower 8bit | | |
| AUDIO 0 | 00000000 | (CH3, 4, 7, 8) |

(CHS 3, 4, 7 AND 8 OF AUDIO ARE USED FOR DATA.)

DIGITAL SIGNAL, PROCESSING APPARATUS, DIGITAL SIGNAL PROCESSING METHOD, DIGITAL SIGNAL RECORDING APPARATUS, DIGITAL SIGNAL REPRODUCING APPARATUS, AND DIGITAL VIDEO-AUDIO SIGNAL RECORDING AND REPRODUCING APPARATUS

BACKGROUND OF THE INVENTION

1. Field of the Invention

The present invention relates to a digital signal processing apparatus, a digital signal processing method, a digital signal recording apparatus, a digital signal reproducing apparatus, and a digital video-audio signal recording and reproducing apparatus that handle a plurality of types of audio data with different bit widths.

2. Description of the Related Art

In recent years, an apparatus that records digital audio data and digital video data to a record medium and that reproduces them therefrom is becoming common. Such an apparatus is for example a digital video tape (cassette) recorder.

In addition, since a surround system as an audio reproducing system that spatially forms a sound field and improves presence of a reproduced sound is becoming common, it is desired to increase the number of channels for audio apparatuses. Moreover, to handle multiple languages, it is necessary to increase the number of channels. FIG. 1 shows an example of the structure of a digital audio apparatus 300 that processes audio data of eight channels. The apparatus 300 has four input terminals each of which can input serial audio data of two channels.

Serial audio data according to for example AES/EBU (Audio Engineering Society/European Broadcasting Unit) standard is input to each terminal. FIGS. 2A, 2B, and 2C show the format of audio data according to the AES/EBU standard. Two channels of serial audio data are alternately sent every half period of a frame sequence FS based on a sampling frequency (see FIG. 2A). In FIG. 2A, the forward side and the backward side of the time series are the LSB side and the MSB side, respectively. Data is followed by bits V, U, C, and P that are control and parity bits.

Up to 24 bits of audio data can be sent per sample. 16 bits of audio data per sample are placed on the backward side every half period of the frame sequence FS (see FIG. 2B). As shown in FIG. 2C, 16 bits of audio data are composed of eight bits of the middle portion of 24 bits and eight bits of the upper portion thereof.

The serial audio data is sent to an audio recording encoder 301. The audio recording encoder 301 converts the serial audio data into parallel audio data. The parallel audio data of each channel is stored in packets having a predetermined length each. After a predetermined process is performed for the packets, an error correction code encoding process is performed for the resultant packets with a product code.

In the encoding process with the product code, data arranged in a matrix is encoded for each symbol (for example, each byte) in the column direction with for example Reed Solomon code. Thus, an outer code parity is generated. Data and the outer code parity are encoded in the line direction. Thus, an inner code parity is generated. Since the outer code parity in the column direction and the inner code parity in the line direction are generated, an error correction code encoding process is performed with the product code.

A data block completed with the inner code parity and the outer code parity is referred to as error correction block. One line of the error correction block corresponds to data of one data packet.

In addition to the error correction code encoding process, to improve the resistance of data against an error, data of each of the eight channels is shuffled in a predetermined data unit. The shuffling process is performed by controlling a memory accessing operation in the error correction code encoding process.

A block ID and a sync pattern are added to each packet that has been encoded with the error correction code and that has been shuffled. Thus, sync blocks are formed. The sync blocks are channel-encoded in a recordable format. The resultant sync blocks are recorded on a record medium 310. In this example, the record medium 310 is a magnetic tape. With record heads disposed on a rotating head portion (not shown), helical tracks are formed and data is recorded thereon.

Audio data recorded on the record medium 310 is reproduced by reproducing heads (not shown) and sent to an audio reproducing decoder 311. The decoder 311 detects a sync pattern of the reproduced signal and extracts sync blocks from the sync pattern. The decoder 311 performs a decoding process with an error correction code corresponding to block IDs stored in the sync blocks and a deshuffling process for correctly arranging the shuffled data. The decoder 311 sets an error flag to data whose error has not been corrected with the error correction code. Such data is corrected by an interpolating process using adjacent data or a muting process.

With a memory used for an error correction code decoding process, data is separated into eight channels of audio data. Audio data of each channel is converted into serial audio data corresponding to the AES/EBU standard. The serial audio data is output from the audio recording encoder 311. The audio data is sent to an amplifier 312 with a D/A converting function for eight channels. The amplifier 312 converts the digital audio data into analog audio signals and amplifies the analog audio signals. The amplified audio signals are sent to speakers 313, 313, . . . The speakers 313, 313, . . . reproduce sounds corresponding to the analog audio signals.

In a multilingual region such as European region, there are many users who desire many channels so as to record audio data in multiple languages to one record medium. On the other hand, production houses that create broadcast materials desire a large bit width per sample rather than a large number of channels so as to accomplish high quality sound.

However, each record medium has the upper limit of record density. Thus, in the conventional record format, the number of channels of audio data and the bit width per sample are fixed to those that satisfy the majority of users. Thus, the conventional system does not meet the needs of users who do not satisfy such fixed specifications.

OBJECTS AND SUMMARY OF THE INVENTION

Therefore, an object of the present invention is to provide a digital signal processing apparatus, a digital signal processing method, a digital signal recording apparatus, a ditigal signal reproducing apparatus, and a digital video-audio signal recording and reproducing apparatus that allow the user to change and set the number of channels of audio data and the bit width per sample.

A first aspect of the present invention is a digital signal processing apparatus for inputting digital audio data of at least one channel, converting the digital audio signal into data blocks having a predetermined data amount each, and outputting the data blocks, the bit width per word processed on one channel being fixed to B, the number of channels of a signal processing system being N (where N is any integer larger than 1), the digital audio signal of one channel being composed of a data sequence whose bit width per word is larger than B, the apparatus comprising an input means for inputting auxiliary information containing at least bit width information and division information at intervals of a predetermined number of words of the input digital audio signal, the bit width information representing the bit width per word, the division information representing that one word is divided into a plurality of portions, a data dividing means for dividing one word of the digital audio data into at least one first division data portion having the bit width B and a second division data portion having a bit width smaller than the bit width B or dividing one word of the digital audio data into a plurality of first division data portions, a channel data forming means for assigning the first division data portion to a predetermined channel of the N channels, adding predetermined bit data to the second division data portion, and assigning the resultant bit added division data portion having the bit width B to a channel other than the predetermined channel, an auxiliary data adding means for adding the auxiliary data to output data of each channel of the channel data forming means at intervals of a predetermined number of words thereof, and a data block forming means for converting output data of each channel of the auxiliary data adding means into data blocks having the predetermined data amount each.

Thus, an input digital audio signal is converted into a plurality of words having a bit width B each. Auxiliary data is added to data sequences of the converted words. The resultant data sequences are assigned to respective channels that are paired in predetermined combinations and then signal-processed.

A second aspect of the present invention is a digital signal processing method for inputting digital audio data of at least one channel, converting the digital audio signal into data blocks having a predetermined data amount each, and outputting the data blocks, the bit width per word processed on one channel being fixed to B, the number of channels of a signal processing system being N (where N is any integer larger than 1), the digital audio signal of one channel being composed of a data sequence whose bit width per word is larger than B, the method comprising the steps of (a) inputting auxiliary information containing at least bit width information and division information at intervals of a predetermined number of words of the input digital audio signal, the bit width information representing the bit width per word, the division information representing that one word is divided into a plurality of portions, (b) dividing one word of the digital audio data into at least one first division data portion having the bit width B and a second division data portion having a bit width smaller than the bit width B or dividing one word of the digital audio data into a plurality of first division data portions, (c) assigning the first division data portion to a predetermined channel of the N channels, adding predetermined bit data to the second division data portion, and assigning the resultant bit added division data portion having the bit width B to a channel other than the predetermined channel, (d) adding the auxiliary data to output data of each channel at step (c) at intervals of a predetermined number of words thereof, and (e) converting output data of each channel of the auxiliary data adding means into data blocks having the predetermined data amount each.

Thus, an input digital audio signal is converted into a plurality of words having a bit width B each. Auxiliary data is added to data sequences of the converted words. The resultant data sequences are assigned to respective channels that are paired in predetermined combinations and then signal-processed.

A third aspect of the present invention is a digital signal recording apparatus for inputting digital audio data of at least one channel, converting the digital audio signal into data blocks having a predetermined data amount each, forming record data with the data blocks, and recording the record data to a record medium, the bit width per word processed on one channel being fixed to B, the number of channels of a signal processing system being N (where N is any integer larger than 1), the digital audio signal of one channel being composed of a data sequence whose bit width per word is larger than B, the apparatus comprising an input means for inputting auxiliary information containing at least bit width information and division information at intervals of a predetermined number of words of the input digital audio signal, the bit width information representing the bit width per word, the division information representing that one word is divided into a plurality of portions, a data dividing means for dividing one word of the digital audio data into at least one first division data portion having the bit width B and a second division data portion having a bit width smaller than the bit width B or dividing one word of the digital audio data into a plurality of first division data portions, a channel data forming means for assigning the first division data portion to a predetermined channel of the N channels, adding predetermined bit data to the second division data portion, and assigning the resultant bit added division data portion having the bit width B to a channel other than the predetermined channel, an auxiliary data adding means for adding the auxiliary data to output data of each channel of the channel data forming means at intervals of a predetermined number of words thereof, an error correction code encoding menas for encoding output data of each channel of the auxiliary data adding means with an error detection code and an error correction code so as to form data blocks having a predetermined data amount each, a first shuffling means for shuffling words of the data blocks in the process for forming the data blocks in the error correction code encoding means, a second shuffling means for arranging the data blocks corresponding to record areas assigned the N channels on the record medium in the process for forming the data blocks in the error correction code encoding means, a record data processing means for processing the data blocks for a proper record format of the record medium, and a recording means for recording output data of the record data processing means to the record areas of the record medium.

Thus, an input digital audio signal is converted into a plurality of words having a bit width B each. Auxiliary data is added to data sequences of the converted words. The resultant data sequences are assigned to respective channels that are paired in predetermined combinations and then resultant data blocks are recorded.

A fourth aspect of the present invention is a digital signal reproducing apparatus for reproducing a digital audio signal from a record medium on which a digital audio signal of at least one channel is recorded, the bit width per word processed on one channel being fixed to B, the number of channels of a signal processing system being N (where N is any integer larger than 1), the digital audio signal of one channel being composed of a data sequence whose bit width per word is larger than B, the record medium having record areas corresponding to the N channels, the digital audio signal being divided into words as data blocks having the bit width B each, the data blocks being processed as record data, the record data being properly recorded in the record areas, the record data containing an error detection code and an error correction and auxiliary data, the auxiliary data containing at least bit width information and division information at intervals of a predetermined number of words of the digital audio signal, the bit width information representing the bit width per word, the division information representing that one word is divided into words having the bit width B each, the apparatus comprising a reproducing means for reproducing the record data from the record areas of the record medium, a record data reproduction processing means for processing output data of the reproducing means and reproducing the predetermined data blocks, an error correcting means for detecting and correcting an error of the reproduced data blocks corresponding to the error detection code and the error correction code contained in the reproduced data blocks and for outputting a predetermined data sequence, a deshuffling means for deshuffling the reproduced data blocks and words contained therein in the process for outputting the predetermined data blocks in the error correcting means, an auxiliary data detecting means for detecting the auxiliary data from the predetermined data sequence of the output data of the error correcting means, a word combining means for combining a word having the bit width B in the predetermined data sequence of one of the N channels with a word having the bit width B of the predetermined data sequence of another channel, and an output means for forming words each having a bit width larger than the bit width B with the words combined by the word combining means corresponding to the auxiliary data and for outputting a data sequence of the formed words as output data of a predetermined channel.

Thus, a digital audio signal composed of words each having a bit width longer than a bit width B is reproduced from a record medium on which a plurality of words having the bit width B have been recorded on predetermined pairs of channels along with auxiliary data.

A fifth aspect of the present invention is a digital video-audio signal recording and reproducing apparatus for encoding each of a digital video signal composed of a data sequence encoded with a variable length code and a digital audio signal composed of a word sequence of which the bit width of each word is larger than bit width B with an error correction code that is a product code, for recording resultant data blocks corresponding to the digital video signal to a record area for the digital video signal formed on a record medium and resultant data blocks corresponding to the digital audio signal to record areas of N channels (where N is any integer larger than 1) formed on the record medium, and for reproducing the digital video signal and the digital audio signal from the record medium, the bit width per word processed on one channel being fixed to B, the number of channels of a signal processing system being N, the apparatus comprising a data sequence converting means for rearranging the data sequence encoded with the variable length code into a predetermined sequence, a data packing means for combining and dispersing each piece of the data sequence of the output data of the data sequence converting means, forming unit data pieces having a predetermined data length each, and arranging the unit data pieces in a predetermined manner, a video outer code encoding means for encoding output data of the data packing means with an outer code of an error correction code as a product code so as to form video data blocks having a predetermined data amount each, a video shuffling means for arranging the video data blocks that are output from the video outer code encoding means in a predetermined manner, an input means for inputting auxiliary information containing at least bit width information and division information at intervals of a predetermined number of words of the input digital audio signal, the bit width information representing the bit width per word, the division information representing that one word is divided into a plurality of portions, a data dividing means for dividing one word of the digital audio data into at least one first division data portion having the bit width B and a second division data portion having a bit width smaller than the bit width B or dividing one word of the digital audio data into a plurality of first division data portions, a channel data forming means for assigning the first division data portion to a predetermined channel of the N channels, adding predetermined bit data to the second division data portion, and assigning the resultant bit added division data portion having the bit width B to a channel other than the predetermined channel, an auxiliary data adding means for adding the auxiliary data to output data of each channel of the channel data forming means at intervals of a predetermined number of words thereof, an audio outer code encoding means for encoding output data of the auxiliary data adding means with an outer code of an error correction code as a product code so as to form audio data blocks having a predetermined data amount each, an audio data shuffling means for arranging the audio data blocks that are output from the audio outer code encoding means in a predetermined manner, a mixing means for mixing output data of the video shuffling means and output data of the audio shuffling means, an identification data adding means for adding identification data to each of the video data blocks and the audio data blocks that are output from the mixing means, an inner code encoding means for encoding the video data blocks and the audio data blocks that are output from the identification data adding means with an inner code of an error correction code as a product code and for outputting record data blocks having a predetermined data amount each, a synchronous pattern adding means for adding a synchronous pattern to each of the record data blocks, a record data processing means for processing the record data blocks with the synchronous patterns to record data in a proper record format of the record medium, a recording means for recording output data of the record data processing means to record areas of the record medium, a reproducing means for reproducing the record data from the record areas of the record medium, a record data reproduction processing means for processing output data of the reproducing means and reproducing the predetermined record data blocks, an inner code decoding means for detecting and correcting an error of the reproduced record data blocks corresponding to the inner code data contained in the record data blocks, a separating means for separating output data of the inner code decoding means into the video data blocks and the audio data blocks corresponding to the identification data contained in output data of the inner code decoding means, a video deshuffling means for deshuffling the video data blocks separated by the separating means in the inverse arrangement of the video shuffling means, a video outer code decoding means for detecting and correcting an error of output data of the video deshuffling means corresponding to the outer code data contained in output data of the video shuffling means, a data depacking means for arranging unit data pieces contained in output data of the video outer code decoding means in the inverse arrangement of the data packing means, performing the inverse processes of the combining and dispersing processes performed by the data packing means, and restoring the original data sequence of the unit data pieces, a data sequence inverse converting means for performing the inverse conversion of the data sequence conversion performed by the data depacking means for the data sequence that is output from the data depacking means so as to restore the original data sequence encoded with the variable length code, an audio deshuffling means for arranging the audio data blocks separated by the separating means in the inverse manner of the audio shuffling means, an audio outer code decoding means for detecting and correcting an error of output data of the audio deshuffling means corresponding to the outer code data contained in output data of the audio deshuffling means, an auxiliary data detecting means for detecting the auxiliary data contained in output data of the audio outer code decoding means, a word combining means for combining the first division data portion of a predetermined channel of the N channels and the bit added division data portion of another channel corresponding to the detected auxiliary data, and an output means for forming words each having a bit width larger than the bit width B with the first division data and the bit added division data combined by the word combining means corresponding to the auxiliary data and outputting a data sequence of the words as output data of a predetermined channel.

Thus, an input digital audio signal is converted into a plurality of words having a bit width B each. Auxiliary data is added to data sequences of the converted words. The resultant data sequences are assigned to respective channels that are paired in predetermined combinations and then resultant data blocks are recorded. A digital audio signal composed of words each having a bit width longer than the bit width B is reproduced from a record medium on which a plurality of words having the bit width B have been recorded on predetermined pairs of channels along with auxiliary data.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram showing the structure of a recording side according to the embodiment of the present invention;

FIG. 4 is a block diagram showing the structure of a reproducing side according to the embodiment of the present invention;

FIGS. 9A, 9B, and 9C are schematic diagrams showing the contents of an ID and a DID added to sync blocks;

FIGS. 10A and 10B are schematic diagrams for explaining an output method and a variable length code encoding process of a video encoder;

FIG. 14 is a schematic diagram showing an example of audio data to which an outer code parity has been added;

FIGS. 15A and 15B are schematic diagrams showing contents of AUX data;

FIGS. 16A, 16B, and 16C are schematic diagram showing an example of the structure of an audio sector;

FIGS. 18A, 18B, 18C, and 18D are schematic diagrams showing an example of the record format of 24-bit audio data;

FIG. 19 is a block diagram showing the structure of an AUX adding portion that converts audio data whose bit width is larger than a predetermined value into a plurality of pieces of audio data whose bit width is the predetermined value each and adds AUX data thereto;

FIG. 21 is a schematic diagram showing an example of an application of the recording and reproducing apparatus;

FIG. 22 is a schematic diagram showing combinations of channels of 16-bit audio data and 24-bit audio data; and FIGS. 23A, 23B, 23C, and 23D are schematic diagrams showing examples of other formats.

DETAILED DESCRIPTION OF THE PREFERRED EMBODIMENTS

Figure 1:
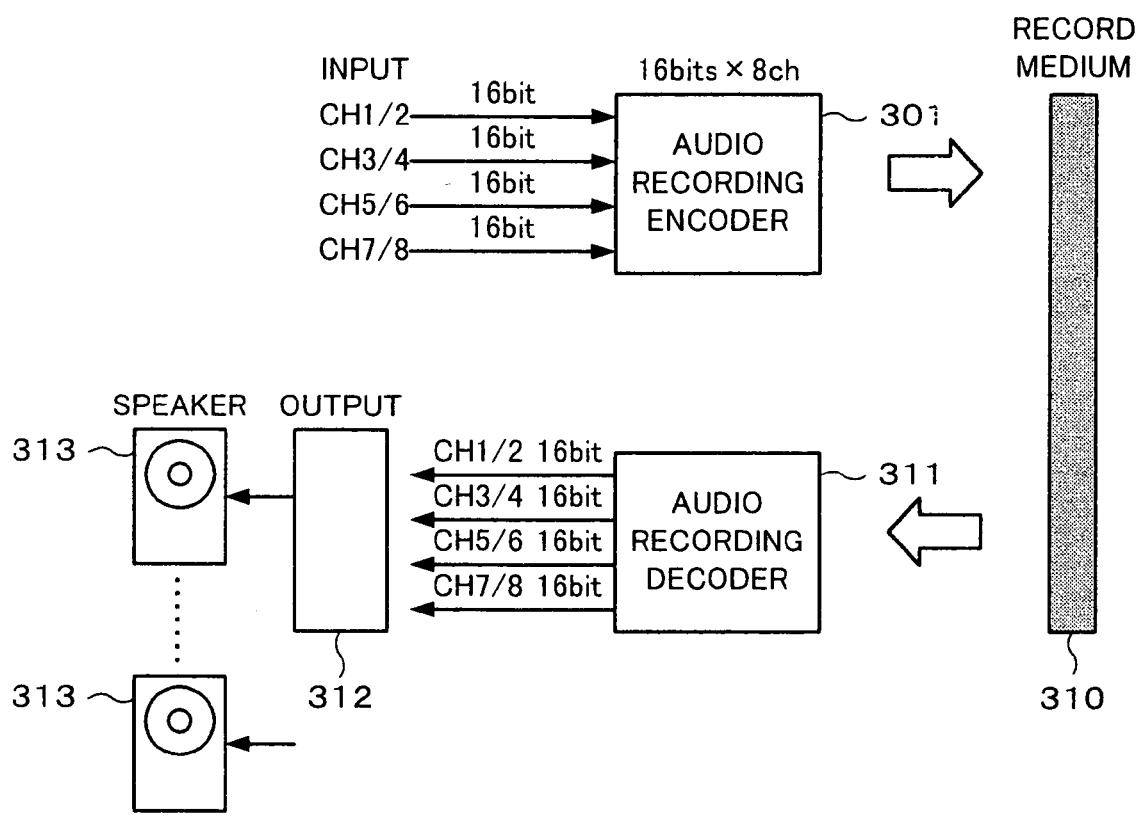
FIG. 1 is a schematic diagram showing an example of the structure of a digital audio apparatus that processes audio data of eight channels.
Figure 2A:
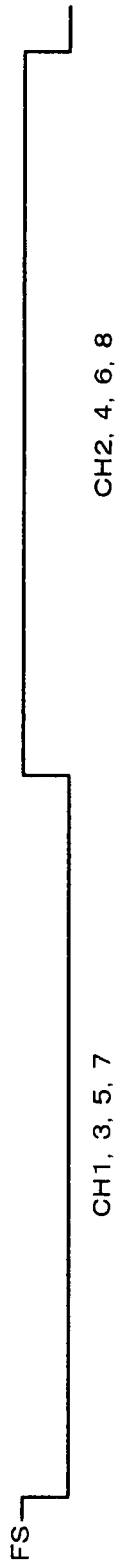
FIGS. 2A, 2B, and 2C are schematic diagrams showing the format of audio data corresponding to AES/EBU standard.
Figure 2B:
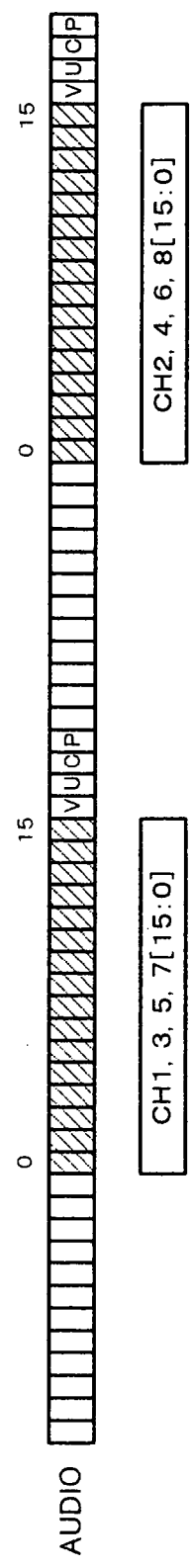
Figure 2C:

Next, an embodiment of the present invention will be described. According to the present invention, when digital audio data is recorded to a record medium, to increase the number of channels, the bit width per sample is decreased. In contrat, to increase the bit width per sample, the number of channels is decreased. Thus, a plurality of types of audio data with different channels and different bit widths can be recorded on one record medium in the same record format.

In addition, according to the present invention, bit width information is recorded in a predetermined area of a record medium. When audio data is reproduced, information that represents the number of channels and the bit width per sample is automatically read from the predetermined region of the record medium and a relevant reproduction mode is set corresponding thereto.

Next, a digital VCR according to an embodiment of the present invention will be described. The digital VCR according to the embodiment is suitably used in the environment of a broadcasting station. The digital VCR can record and reproduce video signals in a plurality of formats. For example, the digital VCR can record and reproduce an NTSC interlace-scanned 480-line signal (hereinafter referred to as 480i signal) and a PAL interlace-scanned 576-line signal (hereinafter referred to as 576i signal) without need to change the hardware. In addition, the digital VCR can record and reproduce an interlace-scanned 1080-line signal (hereinafter referred to as 1080i signal), a progressive noninterlace-scanned 480-line signal (hereinafter referred to as 480p signal), a progressive noninterlace-scanned 720-line signal (hereinafter referred to as 720p signal), and a progressive noninterlace-scanned 1080-line signal (hereinafter referred to as 1080p signal).

According to the embodiment, a video signal and an audio signal are compression-encoded corresponding to the MPEG2 standard. As well known, the MPEG2 standard is a combination of a motion compensation predictive encoding process and a DCT compression encoding process. The data structure of the MPEG2 standard is a hierarchical structure having a block layer (lowest layer), a macro block layer, a slice layer, a picture layer, a GOP (Group Of Picture) layer, and a sequence layer (highest layer).

The block layer is composed of DCT blocks. The DCT process is performed for each DCT block. The macro block layer is composed of a plurality of DCT blocks. The slice layer is composed of a header portion and any number of macro blocks that are placed on one line, not on two lines. The picture layer is composed of a header portion and a plurality of slices. One picture is equivalent to one screen. The GOP layer is composed of a header portion, an I picture (as an intra-frame coded picture), a P picture (as a predictively coded picture), and a B picture (as a bidirectionally predictively coded picture).

When an I picture is encoded, only the information thereof is used. Thus, the I picture is decoded with the information thereof. A P picture uses an I picture or a P picture that has been decoded as a predictive picture that is a reference picture for obtaining the difference. The difference between the P picture and the motion-compensated predictive picture is encoded. Alternatively, the P picture is encoded. One of these methods is selected whichever effective for each macro block. A B picture uses three types of pictures as predictive pictures that are an I picture or a P picture that has been decoded before the B picture, an I picture or a P picture that has been decoded after the B picture, and an interpolated picture created by these two pictures. The difference between the B picture and each of the three types of pictures that have been motion-compensated is encoded. Alternatively, the B picture is intra-encoded. One of these methods is selected whichever effective for each macro block.

Thus, there are four types of macro blocks that are an intra frame coded macro block, a forward inter frame predictive macro block (a future macro block is predicted with a past macro block), a backward inter frame predictive macro block (a past macro block is predicted with a future macro block), and a bidirectional macro block (the current macro block is predicted in both forward and backward directions). All macro blocks of an I picture are intra frame coded macro blocks. A P picture contains intra frame coded macro blocks and forward inter frame predictive macro blocks. A B picture contains all the four types of macro blocks.

Each GOP contains at least one I picture. In other words, each GOP may not contain a P picture and/or a B picture. The sequence layer (which is the highest layer) is composed of a header portion and a plurality of GOPs.

In the MPEG format, a slice is one variable length code sequence. The variable length code sequence is a sequence of which the boundary of data cannot be detected unless a variable length code is decoded.

At the beginning of each of the sequence layer, the GOP layer, the picture layer, the slice layer, and the macro block layer, an identification code having a predetermined bit pattern as a byte is placed. The identification code is referred to as start code. The header portion of each layer contains a header, extension data, or user data. The header of the sequence layer contains the size of a picture (the number of pixels in the vertical direction and the horizontal direction). The header of the GOP layer contains a time code and the number of pictures of the current GOP.

Each of the macro blocks contained in the slice layer is a set of a plurality of DCT blocks. An encoded sequence of DCT blocks is composed in such a manner that a sequence of quantized DCT coefficients is encoded as sets of the number of 0 coefficients and a non-0 coefficient. An identification code arranged as a byte is not added to each macro block and each DCT block of each macro block. In other words, each macro block and each DCT block are not variable length code sequences.

A macro block is an element of which a picture is divided by 16 pixels×16 lines as a matrix. A slice is composed of macro blocks that are horizontally connected. The last macro block of the first slice of two successive slices and the top macro block of the second slice thereof are successive. Macro blocks that overlap between two successive slices are prohibited. The number of macro blocks depends on the size of a picture.

To prevent a signal from deteriorating in a decoding process or an encoding process, it is preferred that encoded data is edited. At this point, a P picture requires a picture that is chronologically preceded by the P picture. On the other hand, a B picture requires a picture that is chronologically preceded by the B picture and a picture that is chronologically followed by the B picture. Thus, data cannot be edited frame by frame. From this point of view, according to the embodiment of the present invention, one GOP is composed of one I picture to edit data frame by frame.

A record area of record data for one frame is predetermined. In the MPEG2 standard, since a variable length code encoding process is used, the data amount for one frame is controlled so that data generated in one frame period is recorded in the predetermined record area. In addition, according to the embodiment, one slice is composed of one macro block. In addition, one macro block is placed in a fixed area having a predetermined length so that data can be properly recorded to a magnetic tape.

FIG. 3 shows an example of the structure of a recording side of the digital video-audio signal recording and reproducing apparatus 100 according to the embodiment of the present invention. When data is recorded, a digital video signal is input from a terminal 101 through a receiving portion of a predetermined interface—for example—SDI (Serial Data Interface). The SDI is an interface defined by SMPTE. With the SDI, a (4:2:2) component video signal, a digital audio video signal, and additional data are sent. The input video signal is sent to a video encoder 102. The video encoder 102 performs a DCT (Discrete Cosine Transform) process for the video signal so as to convert the video signal into coefficient data and encode the coefficient data to variable length code (VLC) data. The variable length code data supplied from the video encoder 102 is an elementary stream corresponding to the MPEG2 standard. The variable length code data is sent to one input terminal of a selector 103.

In addition, data in the format of SDTI (Serial Data Transform Interface) that is an interface defined in ANSI/SMPTE 305M is input through an input terminal 104. This signal is synchronously detected by an SDTI receiving portion 105. The signal is temporarily stored in a buffer. In the buffer, an elementary stream is extracted from the signal. The extracted elementary stream is sent to the other input terminal of the selector 103.

An elementary stream that is selected by the selector 103 is sent to a stream converter 106. The stream converter 106 arranges DCT coefficients of a plurality of DCT blocks corresponding to individual frequency components and rearranges the resultant frequency components. The rearranged elementary stream is sent to a packing and shuffling portion 107.

Since video data in the elementary stream has been encoded with a variable length code, the lengths of macro blocks are different. The packing and shuffling portion 107 packs each macro block in a fixed area. At this point, a portion that is not packed in the fixed area is successively packed in a blank portion against the size of the fixed area. System data such as a time code is supplied from an input terminal 108 to the packing and shuffling portion 107. As with picture data, the packing and shuffling portion 107 performs the recording process for the system data. The packing and shuffling portion 107 rearranges macro blocks of one frame that have taken in the scanning order and shuffles the macro blocks that are recorded on the magnetic tape. The shuffling process allows the update ratio of data that is partly reproduced in a variable speed reproducing mode to be improved.

Video data and system data (in the following description, unless noted, video data means both video data and system data) are supplied from the packing and shuffling portion 107 to an outer code encoder 109. The outer code encoder 109 uses a product code as an error correction code for the video data and the audio data. With the product code, a two-dimensional matrix of video data or audio data is encoded with an outer code in the vertical direction and with an inner code in the horizontal direction. Thus, data symbols are encoded two times. As the outer code and the inner code, Reed-Solomon code can be used.

Output data of the outer code encoder 109 is supplied to a shuffling portion 110. The shuffling portion 110 shuffles sync blocks of a plurality of error correction blocks. Thus, an error can be prevented from concentrating on a particular error correction block. The shuffling process performed by the shuffling portion 110 may be referred to as interleaving process. Output data of the shuffling portion 110 is supplied to a mixing portion 111. The mixing portion 111 mixes the output data of the shuffling portion 110 with audio data. As will be described later, the mixing portion 111 is composed of a main memory.

Audio data is received from an input terminal 112. According to the embodiment of the present invention, a non-compressed digital audio signal is handled. The digital audio signal is separated by an SDI receiving portion (not shown) of the input side or an SDTI receiving portion 105. Alternatively, the digital audio signal is input through an audio interface. The input digital audio signal is supplied to an AUX adding portion 114 through a delaying portion 113. The delaying portion 113 matches the phase of the audio signal with the phase of the video signal. Audio AUX received from an input terminal 115 is auxiliary data having information in association with audio data such as sampling frequency thereof. The AUX adding portion 114 adds the audio AUX to audio data. The audio AUX is treated in the same manner as audio data.

Audio data and AUX data (in the following description, unless noted, audio data means both audio data and AUX data) are supplied to an outer code encoder 116. The outer code encoder 116 encodes audio data with an outer code. Output data of the outer code encoder 116 is supplied to a shuffling portion 117. The shuffling portion 117 shuffles the output data of the outer code encoder 116. The shuffling portion 117 shuffles audio data for each sync block or for each channel.

Output data of the shuffling portion 117 is supplied to the mixing portion 111. The mixing portion 111 mixes the video data and the audio data as data of one channel. Output data of the mixing portion 111 is supplied to an ID adding portion 118. The ID adding portion 118 adds an ID having information that represents a sync block number to the output data of the mixing portion 111. Output data of the ID adding portion 118 is supplied to an inner code encoder 119. The inner code encoder 119 encodes the output data of the ID adding portion 118 with an inner code. Output data of the inner code encoder 119 is supplied to a synchronization adding portion 120. The synchronization adding portion 120 adds a synchronous signal to each sync block. Thus, sync blocks are structured as successive record data. The record data is supplied to a rotating head 122 through a recording amplifier 121 and recorded on a magnetic tape 123. Actually, the rotating head 122 is composed of a plurality of magnetic heads with different azimuths and a rotating drum on which the magnetic heads are disposed.

When necessary, a scramble process may be performed for record data. In addition, when data is recorded, it may be digital-modulated. Moreover, partial response class 4 and Viterbi encoding process may be used.

FIG. 4 shows an example of the structure of a reproducing side according to the embodiment of the present invention. A signal reproduced from a magnetic tape 123 by a rotating head 122 is supplied to a synchronization detecting portion 132 through a reproducing amplifier 131. An equalizing process and a waveform trimming process are performed for the reproduction signal. When necessary, a digital demodulating process and Viterbi decoding process are performed. The synchronization detecting portion 132 detects a synchronous signal at the beginning of a sync block and extracts the sync block.

Output data of the synchronization detecting portion 132 is supplied to an inner code encoder 133. The inner code encoder 133 corrects an error of the output data of the synchronization detecting portion 132 with an inner code. Output data of the inner code encoder 133 is supplied to an ID compensating portion 134. The ID interpolating portion 134 interpolates an ID (for example, a sync block number) of a sync block of which an error has been detected with an inner block. Output data of the ID interpolating portion 134 is supplied to a separating portion 135. The separating portion 135 separates the output data of the ID interpolating portion 134 into video data and audio data. As described above, the video data contains DCT coefficient data generated in the MPEG intra-encoding process and system data. Likewise, the audio data contains PCM (Pulse Code Modulation) data and AUX data.

A deshuffling portion 136 deshuffles video data received from the separating portion 135. The deshuffling portion 136 restores shuffled sync blocks shuffled by the shuffling portion 110 on the recording side to original sync blocks. Output data of the deshuffling portion 136 is supplied to an outer code decoder 137. The outer code decoder 137 corrects an error of output data of the deshuffling portion 136 with an outer code. When an error of the data cannot be corrected, an error flag is placed thereto.

Output data of the outer code decoder 137 is supplied to a deshuffling and depacking portion 138. The deshuffling and depacking portion 138 deshuffles macro blocks that have been shuffled by the packing and shuffling portion on the recording side. In addition, the deshuffling and depacking portion 138 performs a depacking process for data that has been packed on the recording side. In other words, the deshuffling and depacking portion 138 restores fixed length macro blocks to original variable length codes. Moreover, the deshuffling and depacking portion 138 separates system data from the output data of the outer code decoder 137. The system data is obtained from an output terminal 139.

Output data of the deshuffling and depacking portion 138 is supplied to an interpolating portion 140. The interpolating portion 140 corrects data that has an error flag. When a macro block has an error, DCT coefficients of frequency components of the rest of the macro block cannot be restored. In this case, data having an error is substituted with an EOB (End Of Block). DCT coefficients of frequency components after the EOB are set to zero. Likewise, in the high speed reproducing mode, only DCT coefficients corresponding to the length of a sync block are restored. DCT coefficients after the sync block are substituted with zero data. When a header (a sequence header, a GOP header, a picture header, user data, or the like) at the beginning of video data has an error, the interpolating portion 140 restores the header.

Since DCT coefficients of a plurality of DCT blocks are arranged in the order from DC components and from the lowest frequency component to the highest frequency component, even if DCT coefficients after a particular position are ignored, DCT coefficients of DC components and low frequency components can be placed in each of DCT blocks that compose a macro block.

Output data of the interpolating portion 140 is supplied to a stream converter 141. The stream converter 141 performs an inverse process of the process of the stream converter 106 on the recording side. In other words, the stream converter 141 rearranges DCT coefficients arranged in the order of frequency components in DCT blocks to DCT coefficients in the order of DCT blocks. Thus, the reproduction signal is converted into an elementary stream corresponding to the MEPG2 standard.

An input signal and an output signal of the stream converter 141 have sufficient transmission rates (band widths) corresponding to the maximum length of macro blocks. When the length of macro blocks is not limited, it is preferred to secure a band width that is three times larger than the pixel rate.

Output data of the stream converter 141 is supplied to a video decoder 142. The video decoder 142 decodes an elementary stream and outputs video data. In other words, the video decoder 142 performs a dequantizing process and an inverse DCT process. Decoded video data is obtained from an output terminal 143. As an interface to the outside of the apparatus, for example SDI is used. In addition, the stream converter 141 also supplies an elementary stream to an SDTI transmitting portion 144. System data, reproduction audio data, and AUX data are also supplied to the SDTI transmitting portion 144 through relevant paths (not shown). The SDTI transmitting portion 144 converts these signals into an SDTI format stream. The stream is supplied from the SDTI transmitting portion 144 to the outside of the apparatus through an output terminal 145.

Audio data separated by the separating portion 135 is supplied to a deshuffling portion 151. The deshuffling portion 151 performs an inverse process of the shuffling portion 117 on the recording side. Output data of the deshuffling portion 117 is supplied to an outer code decoder 152. The outer code decoder 152 corrects an error of the output signal of the deshuffling portion 117 with an outer code. The outer code decoder 152 outputs audio data whose error has been corrected. When an error of the audio data cannot be corrected, an error flag is set thereto.

Figure 5:
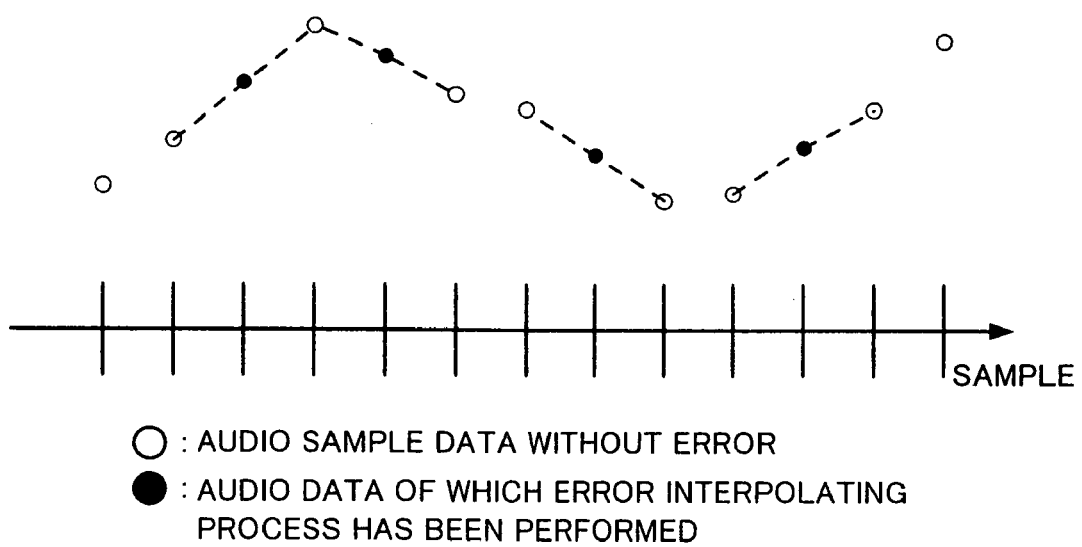
FIG. 5 is a schematic diagram for explaining an example of an interpolating process of audio data.

Output data of the outer code decoder 152 is supplied to an AUX separating portion 153. The AUX separating portion 153 separates audio AUX from the output data of the outer code decoder 152. The separated audio AUX is obtained from an output terminal 154. The separated audio data is supplied to an interpolating portion 155. The interpolating portion 155 interpolates a sample having an erro. As an interpolating method, as shown in FIG. 5, a means value interpolating method of which a particular sample is interpolated with the mean value of a correct sample followed by the particular sample and a correct sample preceded by the particular sample can be used. Alternatively, a preceding value holding method of which the preceding correct sample value is held can be used. Output data of the interpolating portion 155 is supplied to an output portion 156. The output portion 156 performs a mute process, a delay amount adjusting process, and so forth. In the mute process, an audio signal having an error that cannot be compensated is prohibited from being output. In the delay amount adjusting process, the phase of the audio signal is matched with the phase of the video signal. The output portion 156 supplies the reproduction audio signal to an output terminal 157.

The reproducing side according to the embodiment of the present invention also has a timing generating portion, a system controller (that is a microcomputer), and so forth (they are not shown in FIGS. 3 and 4). The timing generating portion generates a timing signal in synchronization with input data. The system controller controls the entire operations of the recording and reproducing apparatus.

According to the embodiment of the present invention, signals are recorded on a magnetic tape by helical scan method. In the helical scan method, inclined tracks are formed by magnetic heads disposed on a rotating head. A plurality of heads are disposed at opposite positions on the rotating drum. In the case that a magnetic tape is wound to the rotating head with a winding angle of around 180°, when the rotating head is turned by 180°, a plurality of tracks can be formed at a time. Two magnetic heads with different azimuths are disposed as one set on the rotating drum so that adjacent tracks have different azimuths.

Figure 6:
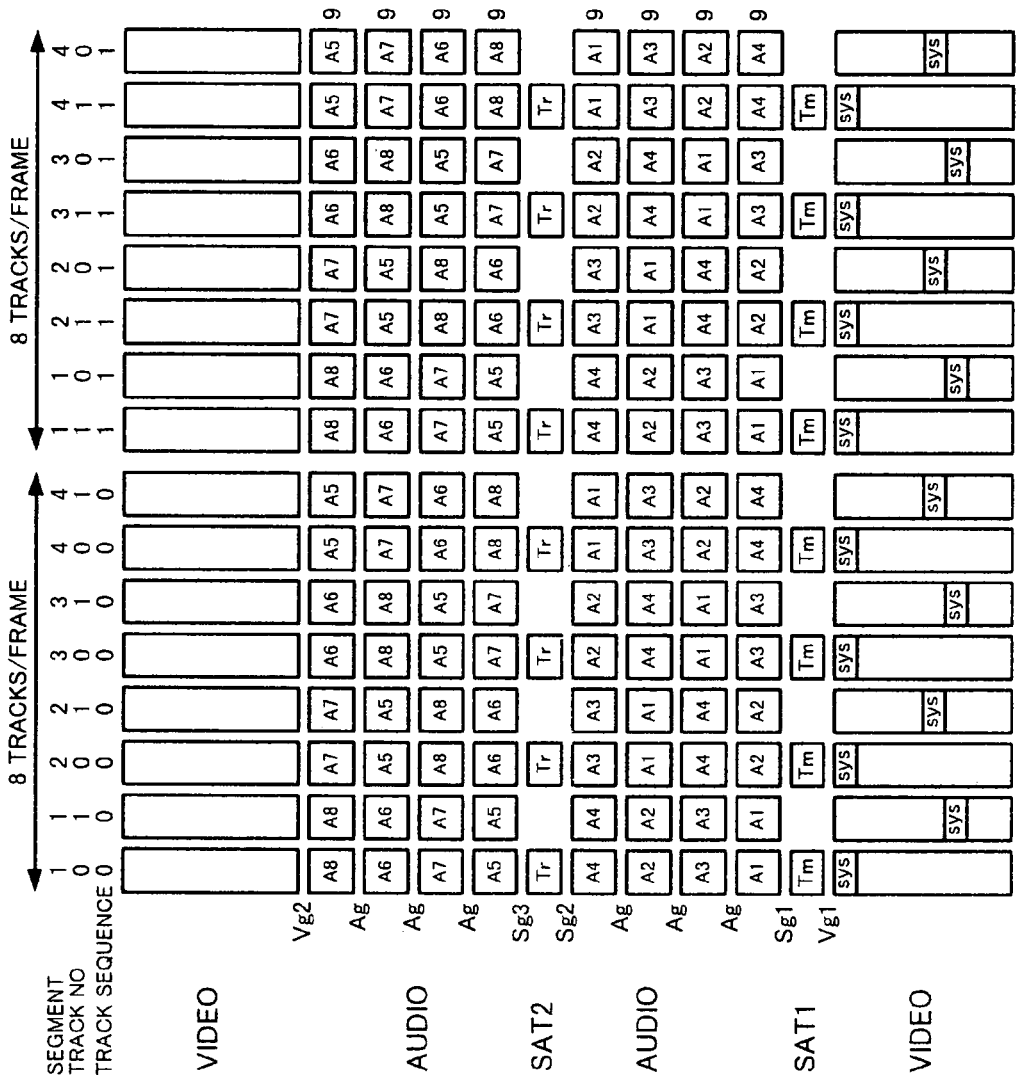
FIG. 6 is a schematic diagram showing an example of a track format.

FIG. 6 shows an example of the track format formed on a magnetic tape by the above-described rotating head. In this example, video data and audio data for one frame are recorded with eight tracks. For example, the 480$i$ video signal of which the frame frequency is 29.97 Hz, the data rate is 50 Mbps, the number of effective lines is 480, and the number of effective horizontal pixels is 720 is recorded along with an audio signal. In addition, the 576$i$ video signal of which the frame frequency is 25 Hz, the data rate is 50 Mbps, the number of effective lines is 576, and the number of effective horizontal pixels is 720 can be recorded along with an audio signal in the tape format shown in FIG. 6.

One segment is formed of two tracks with different azimuths. In other words, eight tracks are composed of four segments. A pair of tracks that form a segment are designated track number [0] and track number [1] corresponding to azimuths. In the example shown in FIG. 6, the track numbers of the first eight tracks are different from those of the second eight tracks. A unique track sequence is assigned to each frame. Thus, even if one of paired magnetic heads cannot read a signal due to clogging or the like, data of the preceding frame can be used. Thus, the influence of the error can be minimized.

Video sectors are formed on both edge sides in the longitudinal direction of each track. An audio sector for audio data is formed between the video sectors. FIGS. 6 and 7 also show positions of audio sectors on a tape.

In the track format shown in FIG. 6, audio data of eight channels can be handled. In FIG. 6, A1 to A8 represent sectors of audio data of channels 1 to 8, respectively. The positions of audio data of individual channels are varied segment by segment. In audio data, audio samples (800 samples or 801 samples in the case that the sampling frequency is 48 kHz and the frame frequency is 29.97 Hz) generated in one field period are separated into even-numbered samples and odd-numbered samples. These sample groups and AUX data compose one error correction block as a product code.

In FIG. 6, data for one field is recorded on four tracks. Thus, two error correction blocks per channel of audio data are recorded on four tracks. Data of the two error correction blocks (including an outer code parity) are divided into four sectors. As shown in FIG. 6, the divided data is dispersedly recorded on the four tracks. A plurality of sync blocks contained in the two error correction blocks are shuffled. For example, four sectors with for example reference number A1 form two error correction blocks of channel 1.

In this example, data of four error correction blocks per tack is shuffled (interleaved) and recorded to an upper side sector and a lower side sector. A system area is formed at a predetermined position of each lower side video sector.

In FIG. 6, SAT1 (Tr) and SAT2 (Tm) are areas for servo lock signals. Gaps (Vg1, Sg1, Ag, Sg2, Sg3, and Vg2) having a predetermined size each are formed between adjacent record areas.

Figure 7A:
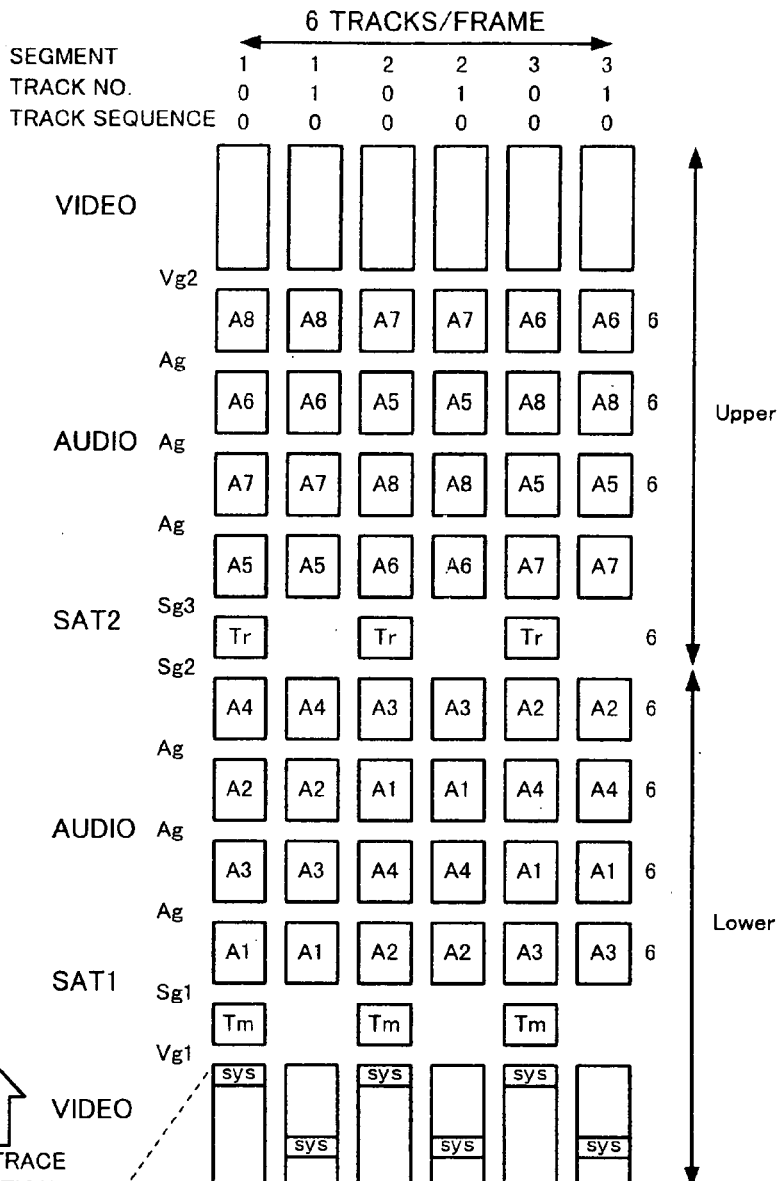
FIGS. 7A, 7B, and 7C are schematic diagrams showing another example of the track format.

In FIG. 6, data of one frame is recorded on eight tracks. However, depending on the format of record data or reproduction data, data of one frame can be recorded on four tracks or six tracks. FIG. 7A shows the format of six tracks per frame. In this example, the track sequence is only [0].

Figure 7B:
Figure 7C:
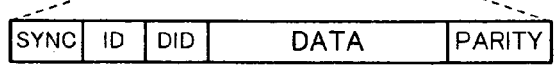

As shown in FIG. 7B, data recorded on a tape is composed of a plurality of blocks that are divided at equal intervals. The blocks are referred to as sync blocks. FIG. 7C shows an outlined structure of one sync block. As will be described later, one sync block is composed of a sync pattern, an ID, a DID, a data packet, and an error correction inner code parity. The sync pattern detects a synchronization. The ID identifies the current sync block. The DID represents the contents of data that follows. Thus, data is composed of sync blocks as packets. In other words, the minimum data unit that is recorded and reproduced is one sync block. A sequence of sync blocks (see FIG. 7B) form for example a video sector (se FIG. 7A).

Figures 8A, 8B, 8C, 8D, 8E:
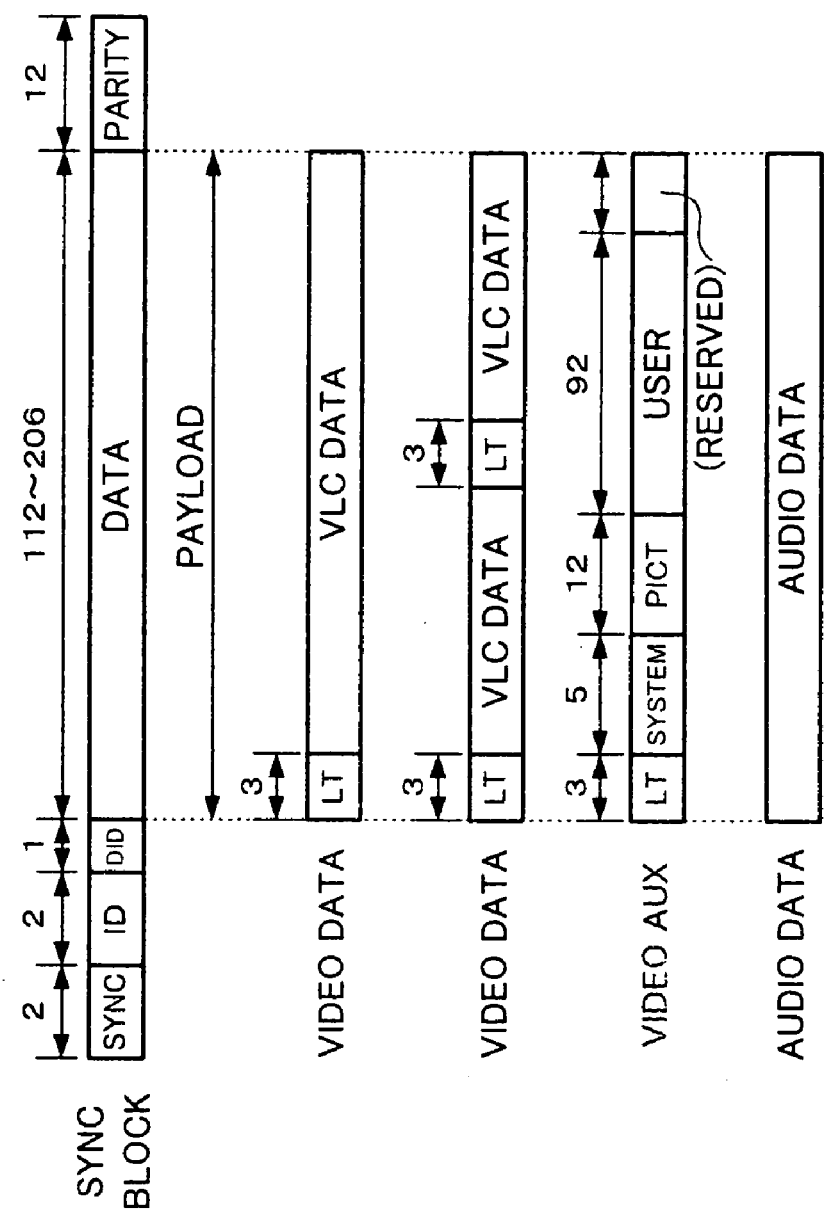
FIGS. 8A, 8B, 8C, 8D, and 8E are schematic diagrams showing a plurality of examples of the structures of sync blocks.

FIG. 8 shows the data structure of a sync block of video data. As described above, one sync block is the minimum data unit that is recorded and reproduced. According to the embodiment of the present invention, one sync block corresponding to the format of video data that is recorded contains data of one or two macro blocks (VLC data). The size of one sync block depends on the format of a video signal that is used. As shown in FIG. 8A, one sync block is composed of a sync pattern of two bytes, an ID of two bytes, a DID of one byte, a data area in the range from 112 bytes to 206 bytes, and a parity (that is a inner code parity) of 12 bytes that are successively arranged. The data area is also referred to as payload.

The sync pattern of two bytes is used to detect a synchronization. The sync pattern has a predetermined bit pattern. By detecting a sync pattern corresponding to a predetermined pattern, a synchronization is detected.

FIG. 9A shows examples of bit assignments of ID0 and ID1. ID1 contains important information unique to the current sync block. The data size of each of ID0 and ID1 is one byte. ID0 contains identification information (that is a sync ID) for identifying a sync block in one track. The sync ID is a serial number of a sync block of the sector. The sync ID is composed of eight bits. A sync block of video data and a sync block of audio data are designated different sync IDs.

ID1 contains track information against the current sync block. When the MSB side and the LSB side are bit 7 and bit 0, respectively, bit 7 represents whether the current sync block is present on the upper side or the lower side of the track. Bits 5 to 2 represent a segment on the track. Bit 1 represents a track number corresponding to the track azimuth. Bit 0 represents whether the current sync block is video data or audio data.

FIG. 9B shows an example of the bit assignment of the DID in the case that the data area of the current sync block is video data. The DID contains information of the payload of the current sync block. The contents of the DID depend on the value of bit 0 of the ID1. When bit 1 of the ID1 represents video data, bits 7 to 4 of the DID are reserved. Bits 3 and 2 of the DIC represent the mode of the payload. The mode is for example the type of the payload. Bits 3 and 2 of the DID represent auxiliary information. Bit 1 of the DID represents whether the payload stores one or two macro blocks. Bit 0 of the DID represents whether or not video data stored in the payload is an outer code parity.

FIG. 9C shows an example of the bit assignment of the DID in the case that the data area of the current sync block is audio data. Bits 7 to 4 of the DID are reserved. Bit 3 of the DID represents whether data stored in the payload of the current sync block is audio data or conventional data. When the payload stores compression-encoded audio data, bit 3 of the DID represents data. Bits 2 to 0 of the DID stores information of NTSC five-field sequence. In other words, in the NTSC standard, when the sampling frequency is 48 kHz, one field of a video signal is equal to 800 samples or 801 samples of an audio signal. This sequence is completed every five fields. Bits 2 to 0 of the DID represents the position of the sequence.

FIGS. 8B to 8E show examples of the payload. In FIGS. 8B and 8C, the payload stores video data of one or two macro blocks (as variable length code encoded data), respectively. In FIG. 8B, the payload stores one macro block. In this case, the first three bytes of the payload contains length information LT that represents the length of the macro block that follows. The length information LT may or may not contain the length thereof. In FIG. 8C, the payload stores two macro blocks. In this case, the length information LT of the first macro block, the first macro block, the length information LT of the second macro block, and the second macro block are successively disposed. The length information LT is required to depack a macro block.

FIG. 8D shows the case that the payload stores video AUX (auxiliary) data. In FIG. 8D, at the beginning of the payload, length information LT is disposed. The length information LT represents the length of video AUX data. The length information LT is followed by system information of five bytes, PICT information of 12 bytes, and user information of 92 bytes. The remaining area of the payload is reserved.

FIG. 8E shows the case that the payload stores audio data. Audio data can be packed in all the length of the payload. The audio signal is for example a PCM signal that is not compressed. Alternatively, the audio signal may be compression-encoded corresponding to a particular method.

According to the embodiment, the length of the payload that is a data storage area of each sync block is optimized depending on whether the sync block is a video sync block or an audio sync block. Thus, the length of the payload of each video sync block is not equal to that of each audio sync block. In addition, the length of each video sync block and the length of each audio sync block are optimally set corresponding to the signal format for use. Thus, a plurality of different signal formats can be integrally handled.

FIG. 10A shows the order of DCT coefficients of video data that are output from a DCT circuit of an MPEG encoder. DCT coefficients are output in the order from a DC component at the upper left position of a DCT block to higher horizontal/vertical frequency components in zigzag scanning method. Thus, as shown in FIG. 10B, a total of 64 DCT coefficients (8 pixels×8 lines) are obtained in the order of frequency components.

The DCT coefficients are encoded with a variable length code by a VLC portion of the MPEG encoder. In other words, the first coefficient is a DC component that is a fixed component. The next components (AC components) are assigned codes corresponding to zero-runs and levels that follow. Thus, since the variable-length code encoded output data against coefficient data of AC components are arranged in the order from the lowest frequency component (lowest order coefficient) to the highest frequency component (highest order coefficient) such as $AC_1$, $AC_2$, $AC_3$, . . . An elementary stream contains the DCT coefficients that have been encoded with a variable length code.

The stream converter 106 rearranges DCT coefficients of the received signal. In other words, the stream converter 106 rearranges DCT coefficients arranged in the order of frequency components in each DCT block into DCT coefficients in the order of frequency components of all DCT blocks of the macro block.

Figure 11A:
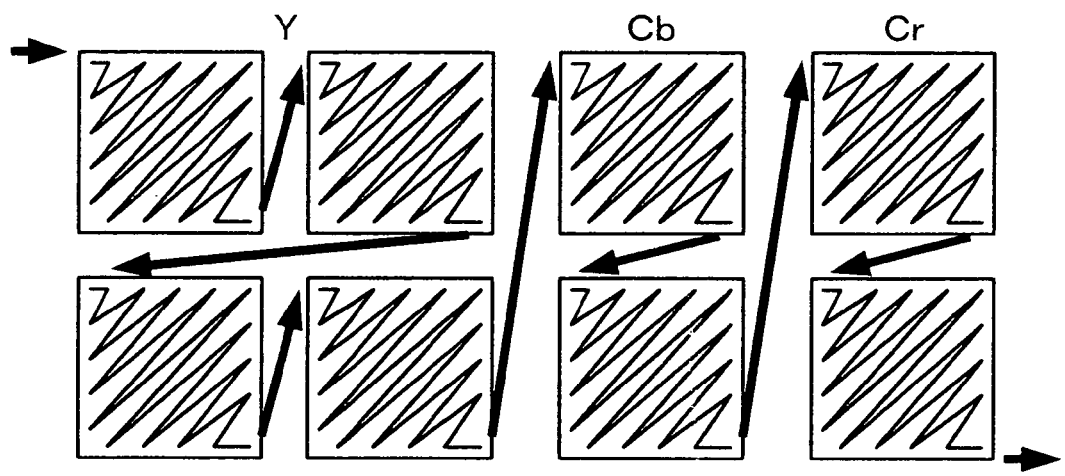
FIGS. 11A and 11B are schematic diagrams for explaining a rearrangement of output data of the video encoder.

FIG. 11 shows DCT coefficients rearranged by the stream converter 106. In the case of a (4:2:2) component signal, one macro block is composed of four DCT blocks ($Y_1$, $Y_2$, $Y_3$, and $Y_4$) of a luminance signal Y, two DCT blocks ($Cb_1$ and $Cb_2$) of a chrominance signal Cb, and two DCT blocks ($Cr_1$ and $Cr_2$) of a chrominance signal Cr.

As described above, the video encoder 102 zigzag-scans DCT coefficients in the order from a DC component to higher frequency components for each DCT block corresponding to the MPEG2 standard. After the video encoder 102 has zigzag-scanned DCT coefficients for one DCT block, the video encoder 102 zigzag-scans DCT coefficients for the next DCT block so as to arrange the DCT coefficients.

In other words, DCT coefficients of each of the DCT blocks $Y_1$, $Y_2$, $Y_3$, and $Y_4$ and the DTC blocks $Cb_1$, $Cb_2$, $Cr_1$, and $Cr_2$ of the macro block are arranged in the order from the DC component to higher frequency components. The variable-length code encoding process is performed in such a manner that codes are designated to sets of runs and levels that follow (for example, DC, $AC_1$, $AC_2$, $AC_3$, . . . ).

Figure 11B:
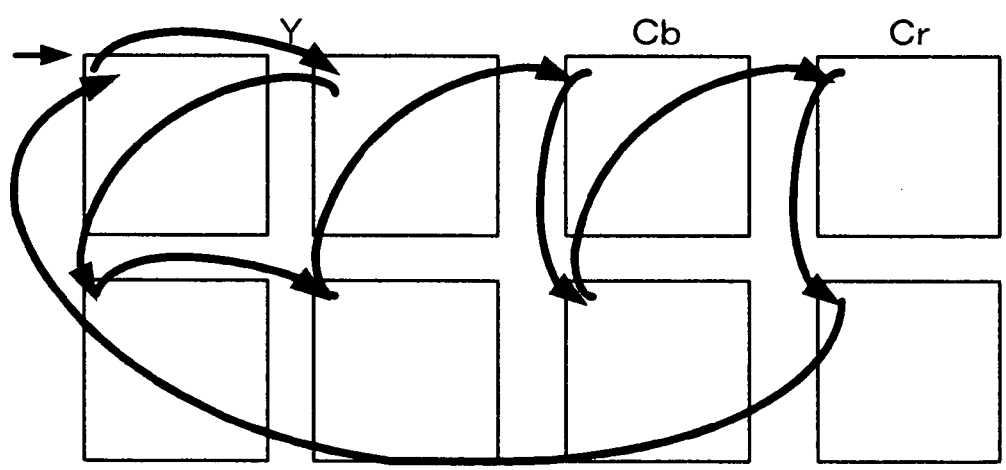

The stream converter 106 interpretes a variable length code of DCT coefficients, detects ends of individual coefficients, and arranges the coefficients corresponding to the individual frequency components of the DCT blocks of the macro block. FIG. 11B shows such a rearranging process. First of all, DC components of eight DCT blocks of the macro block are collected. Next, the lowest frequency AC coefficient components of the eight DCT blocks of the macro block are collected. Thereafter, the next lowest frequency AC coefficient components of the eight DCT blocks of the macro block are collected. In such a manner, coefficient data is rearranged for eight DCT blocks so that AC coefficients corresponding to individual orders are collected.

Rearranged coefficients are $DC(Y_1)$, $DC(Y_2)$, $DC(Y_3)$, $DC(Y_4)$, $DC(Cb_1)$, $DC(Cb_2)$, $DC(Cr_1)$, $DC(Cr_2)$, $AC1(Y_1)$, $AC1(Y_2)$, $AC1(Y_3)$, $AC1(Y_4)$, $AC1(Cb_1)$, $AC1(Cb_2)$, $AC1(Cr_1)$, $AC1(Cr_2)$, . . . (where DC, AC1, AC2, . . . represent variable length code symbols designated sets of runs and levels that follow).

A converted elementary stream of which coefficient data has been rearranged by the stream converter 106 is supplied to the packing and shuffling portion 107. The length of data of a macro block of a converted elementary stream is the same as that of a macro block of a non-converted elementary stream. In the video encoder 102, even if the length of each GOP (one frame) is fixed by a bit-rate controlling operation, the length of each macro block is varied. The packing and shuffling portion 107 packs data of a macro block to a fixed area.

Figure 12A:
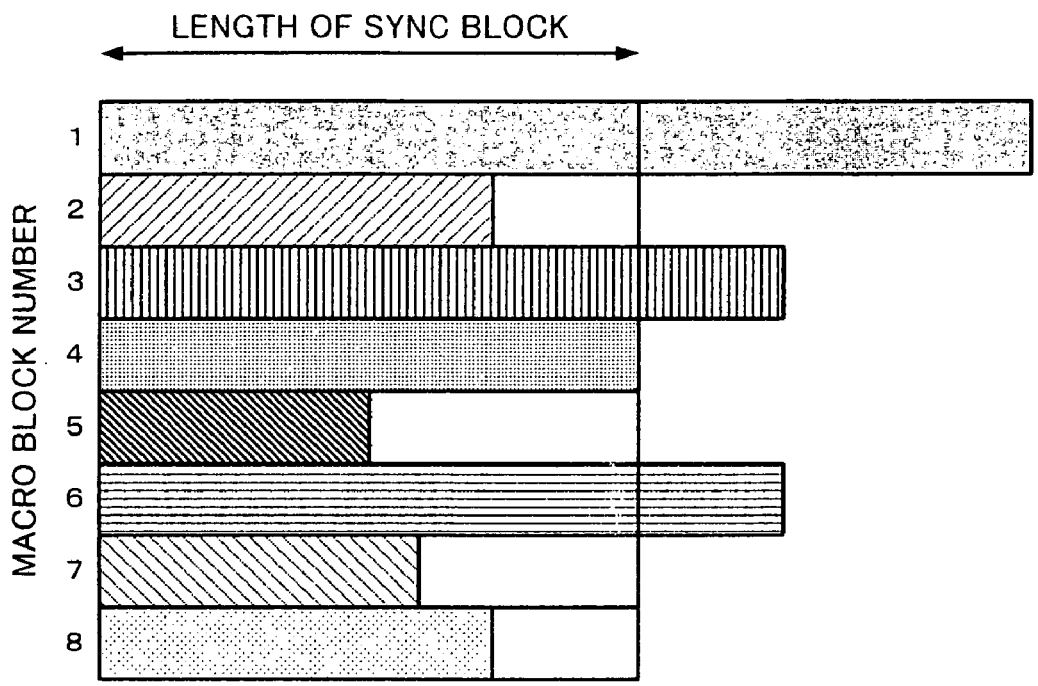
FIGS. 12A and 12B are schematic diagrams for explaining a process for packing rearranged data to sync blocks.
Figure 12B:
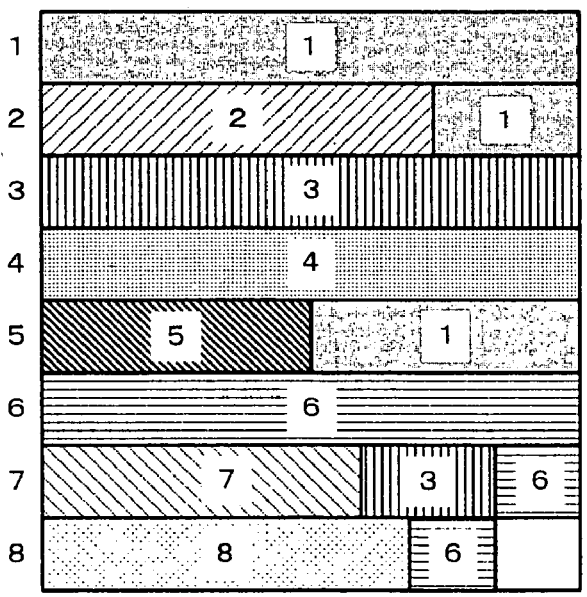

FIGS. 12A and 12B show a packing process for macro blocks performed by the packing and shuffling portion 107. Macro blocks are packed in a fixed area having a predetermined data length. The data length of the fixed area is matched with the length of one sync block that is the minimum unit of data that is recorded and reproduced. Thus, the shuffling process and the error correction code encoding process can be simplified. In FIGS. 12A and 12B, it is assumed that one frame contains eight macro blocks.

As shown in FIG. 12A, in the variable length code encoding process, the lengths of the individual macro blocks are different from each other. In this example, the length of each of data of macro block #1, data of macro block #3, data of macro block #6 is larger than the length of one sync block as the fixed area. On the other hand, the length of each of data of macro block #2, data of macro block #5, data of macro block #7, and data of macro block #8 is smaller than the length of one sync block. The length of data of macro block #4 is almost equal to the length of data of one sync block.

In the packing process, each macro block is packed in the fixed area with the length of one sync block. This is because the data amount generated in one frame period is controlled to a fixed amount. As shown in FIG. 12B, a macro block longer than one sync block is divided at the position corresponding to the length of one sync block. The overflow portion of the macro block against the length of one sync block is packed to the rear blank portions of the other macro blocks each of which is shorter than the length of one macro block.

In the example shown in FIG. 12B, the overflow portion of macro block #1 against the length of one sync block is packed to the rear blank portion of macro block #2. When the length of macro block #2 and the overflow portion of macro block #1 exceeds the length of one sync block, the remaining overflow portion of macro block #1 is packed to the rear blank portion of macro block #5. Next, the overflow portion of macro block #3 is packed to the rear blank portion of macro block #7. In addition, the overflow portion of macro block #6 is packed to the rear blank portion of macro block #7. The further overflow portion of macro block #6 is packed to the rear blank portion of macro block #8. In such a manner, the individual macro blocks are packed to the fixed area with the length of one sync block.

The stream converter 106 can predetermine the length of each macro block. Thus, the packing portion 107 can detect the last end of data of each macro block without need to decode VLC data and check the contents thereof.

Figure 13A:
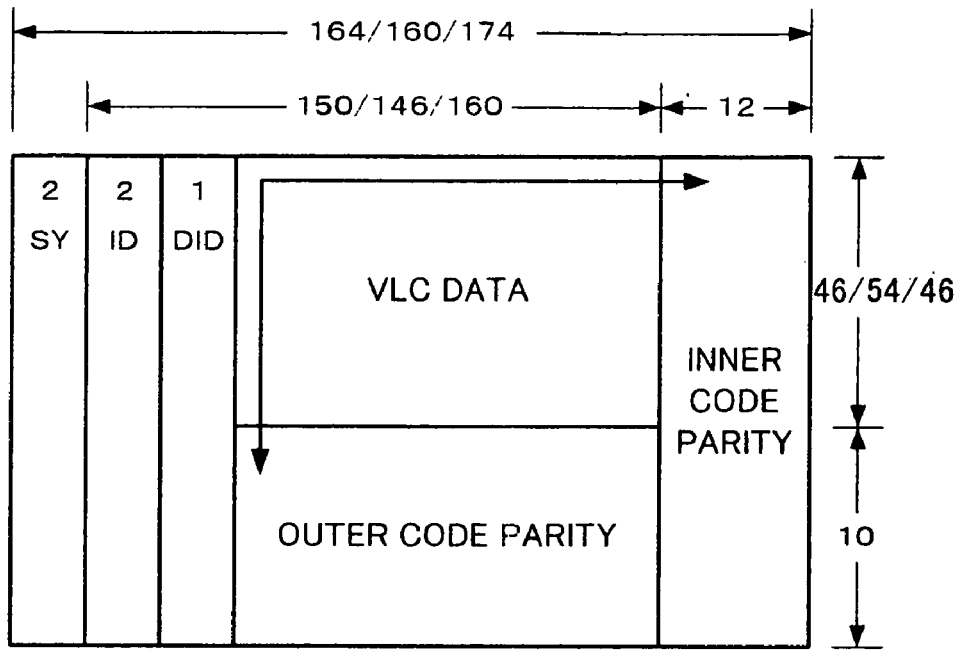
FIGS. 13A and 13B are schematic diagrams for explaining an error correction code encoding process for video data and audio data.
Figure 13B:
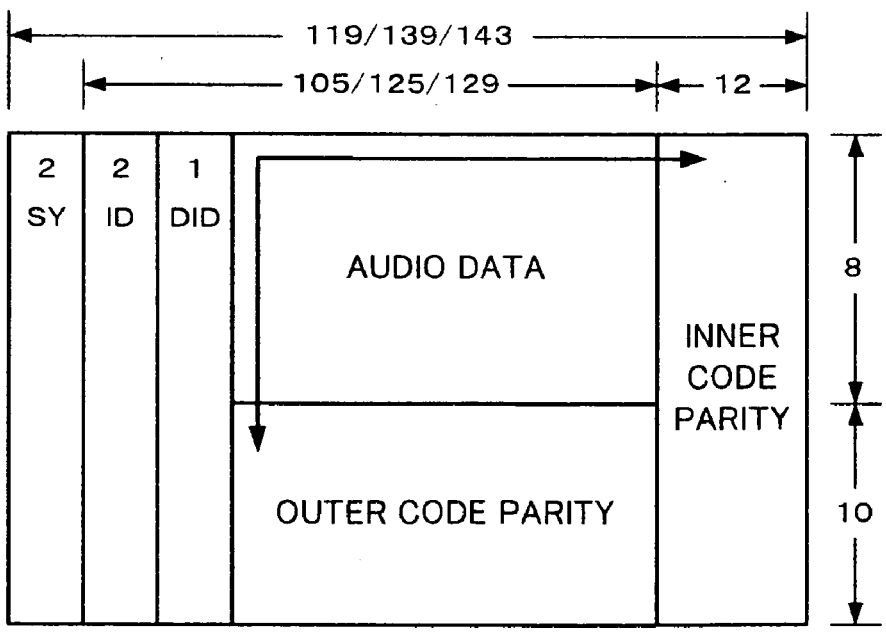

FIGS. 13A and 13B show examples of error correction codes according to the embodiment of the present invention. FIG. 13A shows one error correction block of error correction codes for video data. FIG. 13B shows one error correction block of error correction codes for audio data. In FIG. 13A, VLC data is data received from the packing and shuffling portion 107. A SYNC pattern, an ID, and a DID are added to each line of the VLC data. In addition, an inner code parity is added to each line of the VLC data. Thus, one sync block is formed.

In other words, a 10-byte outer code parity is composed of a predetermined number of symbols (bytes) arranged in the vertical direction of the VLC data. An inner code parity is composed of a predetermined number of symbols (bytes) of the ID, the DID, and the VLC data (or the outer code parity) arranged in the horizontal direction of the outer code parity. In the example shown in FIG. 13A, 10 outer code parity symbols and 12 inner code parity symbols are added. As a real error correction code, Reed Solomon code is used. In FIG. 13A, the length of VLC data in one sync block varies because the frame frequencies of video data vary as in 59.94 Hz and 23.976 Hz.

As with video data, as shown in FIG. 13B, a product code for audio data is used to generate 10 outer code parity symbols and 12 inner code parity symbols. In the case of audio data, the sampling frequency is for example 48 kHz. One sample is quantized to 16 bits. Alternatively, one sample may be quantized to other than 16 bits (for example, 24 bits). Corresponding to the frame frequency, the data amount of audio data in one sync block varies. As was described above, audio data for one field per channel composes two error correction blocks. One error correction block contains odd-numbered or even-numbered audio samples and audio AUX.

As described above, in the digital video-audio signal recording and reproducing apparatus 100, each sample of audio data is fixedly processed with 16 bits (2 bytes).

Next, in the digital video-audio signal recording and reproducing apparatus 100 which each sample of audio data is processed with 16 bits, a method for treating audio data as samples whose bit width is 24 bits each will be described. First of all, the record format of audio data will be described in detail.

In the following description, audio data of which the bit width per sample is 16 bits is referred to as 16-bit audio data. Likewise, audio data of which the bit width per sample is 24 bits is referred to as 24-bit audio data.

FIG. 14 shows an example of audio data to which an outer code parity has been added by the outer code encoder 116. In this example, the sampling frequency of audio data is 48 kHz and the field interval of video data is 50 Hz. 960 samples of audio data correspond to one field interval of video data. On each channel of audio data, in one field interval, two error correction blocks of which an outer code parity for 10 sync blocks is added to audio data for eight sync blocks are formed. In other words, audio data in one field interval is composed of 36 sync blocks including an outer code parity.

In audio data of each channel, even-numbered samples of one field interval form one error correction block. Likewise, odd-numbered samples of one field interval form one error correction block. In FIG. 14, each column of one error correction block represents data of one sample. In this example, since one sample is composed of 16 bits (two bytes), each column represents data of 16 bits. One line in the horizontal direction represents one sync block. A number designated to each line is referred to as outer code number that is an identification number of a sync block in one field interval.

The first sample of each of the first three sync blocks of each error correction block contains AUX data. FIGS. 15A and 15B show an example of contents of AUX data. FIG. 15A shows the bit assignment of AUX data. FIG. 15B shows the definitions of the contents of AUX data.

AUX0 is composed of data EF of two bits, bit length data B of one bit, data D of one bit, audio mode Amd of two bits, and data FS of two bits. The data EF represents the edit point of audio data. The bit length data B represents whether the number of quantizing bits of one audio sample is 16 bits or 24 bits. The data D represents whether or not the audio data is non-compressed audio data. The audio mode Amd represents whether or not the current channel is paired with another channel (the channel pair will be described later). The data FS represents whether or not the sampling frequence is 48 kHz, 44.1 kHz, 32 kHz, or 96 kHz. The remaining eight bits is reserved. When one sample is composed of 24 bits, eight more bits are reserved.

With the data B of AUX0, it is determined whether audio data of one field interval is audio data of 16 bits or audio data of 24 bits. With the audio mode Amd, it is determined whether or not the current channel is paired with another channel.

AUX1 is all reserved. In AUX2, the first eight bits represent a format mode. The format mode is followed by a reserved area of eight bits. When one sample is composed of 24 bits, eight more bits are reserved. The format mode is composed of [Line mode] of two bits, [Rate] of two bits, [Scan] of one bit, and [Freq] of three bits. With [Line mode], [Rate], [Scan], and [Freq], the video format can be obtained.

FIGS. 16A, 16B, and 16C show an example of the structure of an audio sector. In this example, one audio sector is composed of six sync blocks corresponding to the fomat of FIG. 5A. Data of one field interval is recorded on six tracks. In FIG. 16A, one line in the horizontal direction represents one sector on one track. A number in each column is equal to an outer code number shown in FIG. 10. 36 sync blocks that compose audio data for one channel in one field interval are shuffled on each track and for each sync block. Thus, the 36 sync blocks are rearranged as shown in FIG. 16A. In addition, six sync blocks are arranged in each sector (see FIG. 16B). In each sync block, a sync pattern, a block ID, a DID, a data packet, and an inner code parity are successively disposed (see FIG. 16C).

In the data packet, D0, D1, D2, . . . are successively packed byte by byte. In other words, the first eight bits of each of AUX0, AUX1, and AUX2 are stored in D0 at the beginning of the data packet.

Figure 17A:
FIGS. 17A, 17B, 17C, 17D, and 17E are schematic diagrams showing an example of the format of audio data that is input to the recording and reproducing apparatus.

FIGS. 17A, 17B, 17C, 17D, and 17E show an example of the format of audio data that is input to the apparatus 100. Audio data is input as serial data corresponding to for example AES/EBU standard from an input terminal 112. In FIG. 17A, FS represents a frame sequence that is a sampling sequence of audio data. In this example, in one period of the frame sequence FS, data having a bit width of up to 24 bits can be sent. With serial data of one system, audio data of two channels can be sent. Whenever the frame sequence FS is inverted, one channel is switched to the other channel. In this example, one input system is assigned to each of a pair of channels 1 and 2, a pair of channels 3 and 4, a pair of channels 5 and 6, and a pair of channels 7 and 8.

Figure 17B:
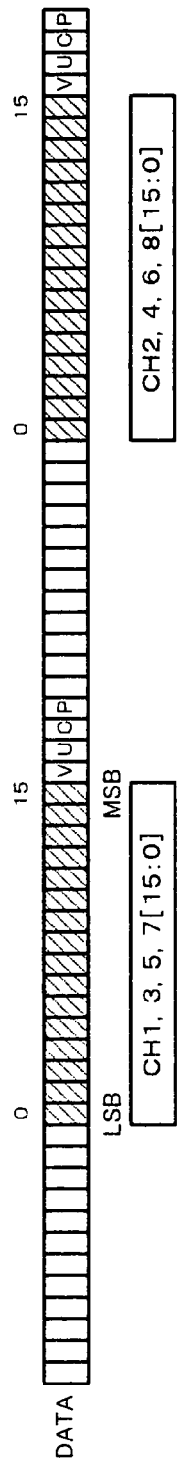
Figure 17C:
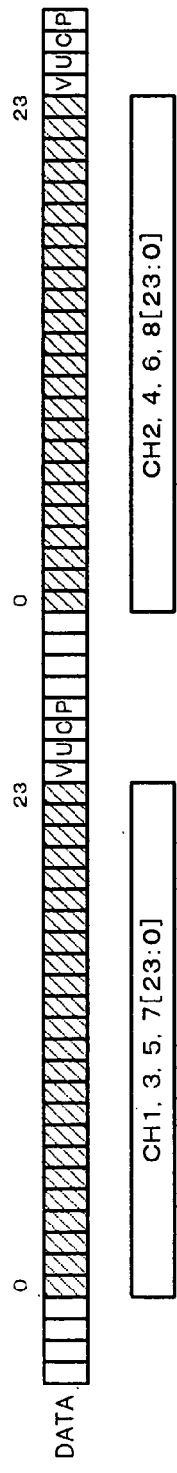

FIG. 17B shows an example of the format of 16-bit audio data. The forward side and the backward side of the time series are referred to as LSB side and MSB side, respectively. Data is packed to the frame sequence FS from the LSB side to the MSB side. FIG. 17C shows an example of the data format of 24-bit audio data. Four control bits are followed by the MSB of the 24-bit audio data.

Figure 17D:

Audio data in such a serial data format is input to the apparatus 100. The audio data is processed every byte (eight bits). FIG. 17D shows an example of which 16-bit audio data that is input as shown in FIG. 7B is processed every byte (eight bits). Since data is processed every symbol in the above-described error correcting process, when one symbol is composed of for example one byte, the process can be simplified.

One sample of 16-bit audio data is composed of the middle portion of eight bits and the upper portion of eight bits of 24 bits of one frame sequence FS. The middle portion of eight bits is data 0 of the low order eight bits of the 16-bit audio data. The upper portion of eight bits is data 1 of high order eight bits of the 16-bit audio data. The low order eight bits of 24 bits are filled with for example [0] data.

Figure 17E:
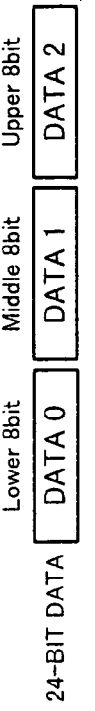

FIG. 17E shows an example of which 24-bit audio data that is input as shown in FIG. 17C is processed every byte. 24 bits of one frame sequence FS are divided every eight bits from the LSB side as data 0 of the lower portion of eight bits, data 1 of the middle portion of eight bits, and data 2 of the upper portion of eight bits.

AUX data stored in AUX0, AUX1, and AUX2 is supplied from the input terminal 115. At this point, bit-length data B is input corresponding to the format of audio data that is input from the input terminal 112. When 16-bit audio data is input from the input terminal 112, [0] is input as the bit-length data B. When 24-bit audio data is input from the input terminal 112, [1] is input as the bit-length data B. The AUX adding circuit 114 adds the AUX data to the audio data that is input from the input terminal 112 so that the AUX data is added at the predetermined position shown in FIG. 14.

FIGS. 18A, 18B, 18C, and 18D show an example of the record format of 24-bit audio data that is input in such a manner. In this example, 24-bit audio data is input in Ch 1 and Ch 2, Ch 5 and Ch 6 of the input terminal of the input terminal 112, and is not input in Ch 3 and Ch 4, Ch 7 Ch 8 of the input terminal of the input terminal 112. FIGS. 18A and 18B show a frame sequence FS and an input data sequence, respectively. FIG. 18C shows audio data at an interface point of input. For example, in the first sequence, data of channel 1 (Ch 1) is input with a bit width of 24 bits. In the next sequence, data of Ch 2 is input with a bit width of 24 bits.

The data of 24 bits of Ch 1 is separated into lower order eight bits and high order eight bits (see FIG. 18C). As shown in FIG. 18D, the high order 16 bits are used as data of Ch 1. On the other hand, the low order eight bits are used as low order eight bits of another channel (for example, Ch 3). At this point, the high order eight bits of Ch 3 are filled with [0] data.

Likewise, input data of Ch 2 is separated into high order 16 bits and low order 8 bits (see FIG. 18C). The high order 16 bits are used as data of Ch 2. The low order eight bits are used as data of low order eight bits of another channel (in this example, Ch 4) (see FIG. 18D). As with Ch 3, the high order eight bits of Ch 4 are filled with [0] data.

This process applies to input data of Ch 5 and Ch 6 shown in FIG. 18C. In these cases, low order eight bits of input data of Ch 5 are used as data of low order eight bits of Ch 7. Low order eight bits of input data of Ch 6 are used as low order eight bits of Ch 8 (see FIG. 18D) Pairs of channels to which 24-bit audio data that is input is separated are pre-designated. For example, Ch 1 and Ch 3 are paired. Ch 2 and Ch 4 are paired. Ch 5 and Ch 7 are paired. Ch 6 and Ch 8 are paired. In other words, high order 16 bits of 24-bit audio data of Ch 1 are assigned to Ch 1. The low order eight bits of 24-bit audio data of Ch 1 are assigned to Ch 3. High order eight bits of Ch 3 are filled with [0] data.

This process applies to other pairs. In other words, high order 16 bits of 24-bit audio data that is input to Ch 2 are assigned to Ch 2. The low order eight bits of 24-bit audio data of Ch 2 are assigned to Ch 4. High order eight bits of Ch 4 are filled with [0] data. High order 16 bits of 24-bit audio data that is input to Ch 5 are assigned to Ch 5. The low order eight bits of 24-bit audio data of Ch 5 are assigned to Ch 7. High order eight bits of Ch 7 are filled with [0] data. High order 16 bits of 24-bit audio data that is input to Ch 6 are assigned to Ch 6. The low order eight bits of 24-bit audio data of Ch 6 are assigned to Ch 8. The high order eight bits of Ch 8 are filled with [0] data.

In such a manner, high order 16 bits and low order eight bits of 24-bit audio data are assigned to one channel and another channel that are paired. Thereafter, the same process as that for 16-bit audio data is performed.

FIG. 19 shows the structure of the AUX adding portion 114.

In FIG. 19, reference numerals 417 to 420 are input terminals to which signals for forming control signals for controlling individual portions of the AUX controlling portion 114 are supplied. A unit pulse signal UP that represents one unit of audio data corresponding to one edit unit of video data is supplied to the input terminal 417. A frame sequence signal FS that represents one unit of words of original audio data is supplied to the input terminal 418. AUX data AUX corresponding to one edit unit of video data is supplied to the input terminal 419. A signal CH that represents a pair of channels to which 24-bit audio data is assigned is supplied to the input terminal 421.

A channel data forming and controlling portion 422 generates control signals for controlling the individual portions of the AUX adding portion 114.

In FIG. 19, reference numerals 401 to 404 are input terminals to which audio data of individual channels having a data width of 24 bits each are supplied.

Reference numeral 405 is a multiplexer. When input audio data contains audio data of two channels having a data width of 24 bits, the multiplexer 405 separates the 24-bit audio data into two channels with a control signal formed corresponding to the signal FS. When the input 24-bit audio data is audio data of one channel, the multiplexer 405 is not required.

Reference numeral 406 is a channel data forming portion. The channel data forming portion 406 separates 24-bit audio data into two 16-bit audio data portions.

In this example, the channel data forming portion 406 separates the 24-bit audio data into a word of low order eight-bit data and 16-bit data of middle eight-bit data and high order eight-bit data corresponding to the bit length data and the audio mode data contained in the AUX data. In the word of 16-bit data to which low order eight bits are placed, the low order eight bits are placed on the low order bit side. Data [0] is placed in all bits of the high order bit side of the 16-bit data.

The two 16-bit data portions are assigned to different channels of the signal processing system. In this example, as described above, two 16-bit data portions of Ch 1 are assigned to Ch 1 and Ch 3. Two 16-bit data portions of Ch 2 are assigned to Ch 2 and Ch 4. Two 16-bit data portions of Ch 5 are assigned to Ch 5 and Ch 7. Two 16-bit data portions of Ch 6 are assigned to Ch 6 and Ch 8.

A channel data forming and controlling portion 421 determines the number of portions to which the input audio data is divided and channels to which the divided portions are assigned corresponding to the bit length data, the audio mode data, and the signal CH contained in AUX data.

When the word width of input audio data is larger than 24 bits (in this example, 32 bits or 48 bits), the divided 16-bit data portions are assigned to a total of three channels.

Reference numeral 407 is a buffer memory. The buffer memory 407 temporarily stores output data of the individual channels of the channel data forming portion 406. The buffer memory 407 arranges the phases of the output data of the individual channels.

Reference numeral 408 is an AUX adding and processing portion. The AUX adding and processing portion 408 adds AUX data to output data of the buffer memory 407. In this example, the AUX adding and processing portion 408 adds the AUX data to each block of audio data represented by the unit pulse signal UP.

Reference numerals 409 to 416 are output terminals from which 16-bit audio data to which AUX data has been added is output.

The outer code encoder 116 adds an outer code parity to the output data of the paired channels of the AUX adding circuit 114 as process of each channel. The shuffling circuit 117 shuffles data of each pair of channels. The MIX circuit 111 mixes the output data of the shuffling circuit 117 with video data and rearranges the resultant data in the record order. The ID adding circuit 118 adds a block ID to each sync block of output data of the MIX circuit 111. The inner code encoder 119 adds an inner code parity of 12 bytes to the output data of the ID adding circuit 118. The SYNC adding circuit 120 adds a sync pattern to output data of the inner code encoder 119. The recording head 122 records output data of the SYNC adding circuit 120 to the magnetic tape 123 through the recording amplifier 121. Since the same process as 16-bit audio data is performed for 24-bit data, the record pattern for the 24-bit data on the magnetic tape 123 is the same as that of the 16-bit audio data.

Next, a process for reproducing 24-bit audio data that has been recorded in the above-described recording process will be described. As described above, the 24-bit audio data is separated into high order 16 bits and low order eight bits. The high order 16 bits and low order eight bits are recorded on a pair of channels as with 16-bit audio data. Thus, when the data is reproduced, the processes from the reproducing head 122 to the outer code decoder 152 shown in FIG. 4 are the same as those for 16-bit audio data. Consequently, to prevent redundancy, the description of these processes is omitted.

Data that has been error-corrected by the outer code decoder 152 is supplied to the AUX separating circuit 153. Output data of the outer code decoder 152 is data corresponding to outer code numbers 0 to 15 of error correction blocks shown in FIG. 14. The first data D0 of each of data packets corresponding to the outer code numbers 0 to 5 is AUX data that is composed of AUX0 to AUX2. The AUX separating circuit 153 separates output data of the outer code decoder 152 into audio data and AUX0 to AUX2.

The AUX data separated by the AUX separating circuit 153 is supplied to a system controller (not shown). The system controller extracts required information from the AUX data. The system controller extracts the bit length data B and the audio mode Amd from AUX0. With the bit length data B and the audio mode Amd, the system controller determines whether or not the audio data of the current field interval is 16-bit audio data or 24-bit audio data that has been separated into high order 16 bits and low order 8 bits assigned to a pair of channels. The system controller supplies a control signal corresponding to the determined result to the output portion 156.

The AUX data is stored every field interval. Thus, the determination and process corresponding to the AUX data can be performed every field interval.

Audio data separated by the AUX separating circuit 153 is supplied to the interpolating circuit 155. The interpolating circuit 155 performs the above-described interpolating process for the audio data received from the AUX separating circuit 153. Output data of the interpolating circuit 155 is supplied to the output portion 156. The interpolating circuit 155 performs the interpolating process for each portion of high order 16 bits and low order 8 bits assigned to a pair of channels.

In other words, the interpolating process is performed for data of a channel to which high order 16 bits of 24-bit audio data is assigned. In addition, the interpolating process is performed for a channel to which low order eight bits of the 24-bit audio data is assigned and whose high order eight bits are filled with [0] data in the same manner as the interpolating process for 16-bit audio data.

Alternatively, the interpolating process may be performed after the output portion 156 decodes 24-bit audio data.

When 24-bit audio data is separated into high order 16 bits assigned to one of a pair of channels and low order 8 bits assigned to the other of the pair of channels and the separated data is supplied to the output portion 156, it combines the paired data and restores the original 24-bit audio data. For example, the output portion 156 adds high order 16 bits of Ch 1 and low order eight bits of Ch 3 that is paired with Ch 1 and output the resultant data as 24-bit audio data. In addition, the output portion 156 controls an output channel for the 24-bit audio data and outputs the resultant data as output audio data to the output terminal 157.

Alternatively, the output portion 157 may output audio data of a plurality of channels as serial data of one system. As another alternative manner, the output portion 157 may output audio data of a plurality of channels to respective output terminals 157.

Figure 20:
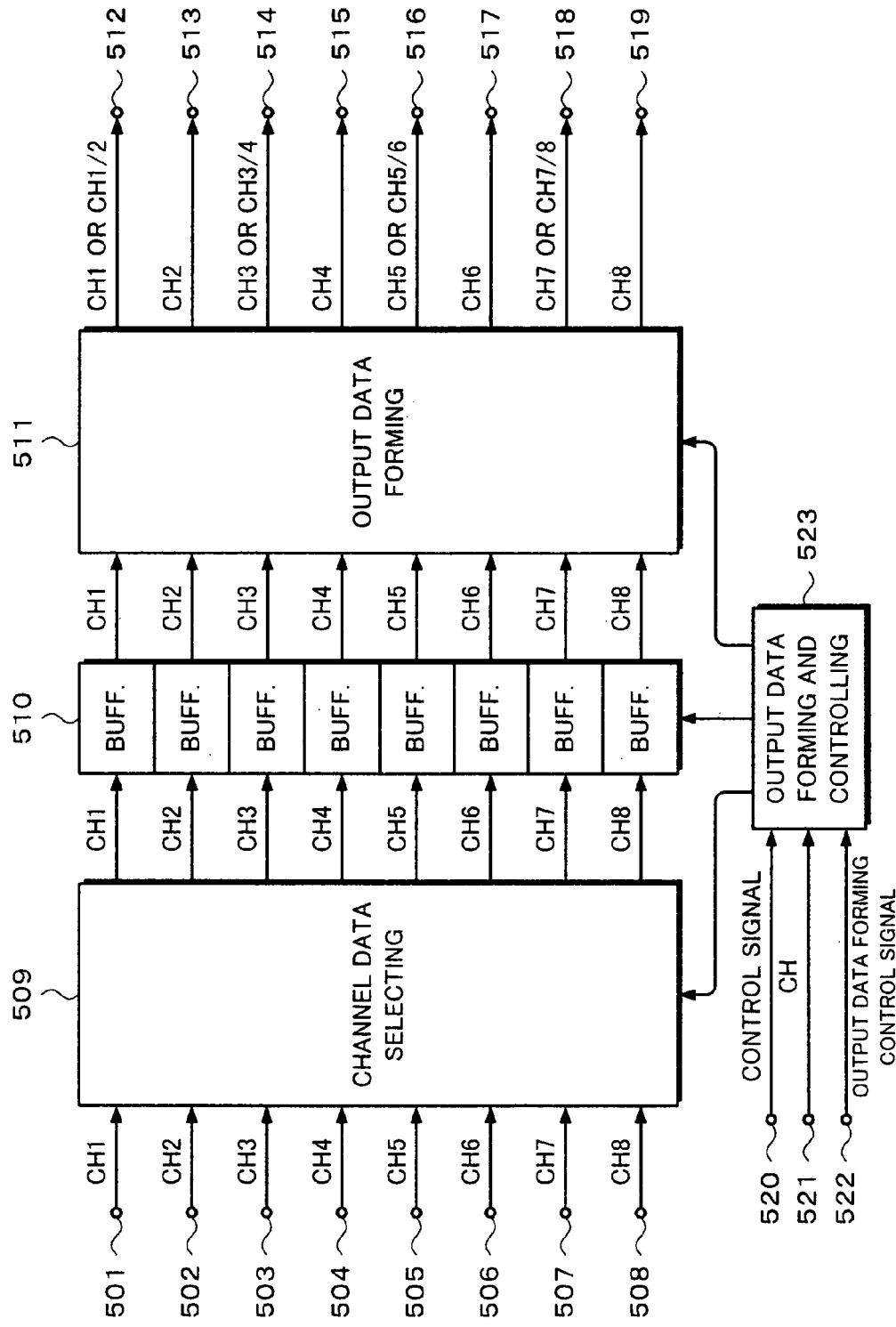
FIG. 20 is a block diagram showing the structure of a data output portion that converts audio data whose bit rate is a predetermined bit width into data whose bit width is the original bit width.

FIG. 20 shows the structure of the output portion 156.

In FIG. 20, reference numeral 520 is an input terminal to which a control signal is supplied from the system controller. Reference numeral 521 is an input terminal to which a signal CH that represents a pair of channels to which 24-bit audio data is separated and assigned is supplied. Reference numeral 522 is an input terminal to which an output data forming control signal for controlling the number of channels for 24-bit audio data that is output from the input/output portion 126 is supplied.

Reference numeral 523 is an output data forming and controlling portion that generates controls signals for controlling the individual portions of the output portion 156 corresponding to the control signal and the output data forming control signal received from the input terminals 520 and 522.

Reference numerals 501 to 508 are input terminals to which data of pairs of Ch 1 to Ch 8 is supplied.

Reference numeral 509 is a channel data combining portion that combines a pair of input data portions to 24-bit data. The channel numbers on the input side of the channel data combining portion 509 are equal to those of the signal processing system of the apparatus 100. The channel numbers on the output side of the channel data combining portion 509 are equal to channel numbers of original input audio data (audio data that is input to the recording system).

The channel data combining portion 509 deletes data [0] of high order eight bits from a word in which low order eight bits have been placed and extracts data of the low order eight bits. In addition, the channel data combining portion 509 extracts 16-bit data of middle order eight bits and high order eight bits. The channel data combining portion 509 converts extracted data portions into one data sequence and outputs the sequence from an output terminal corresponding to the input channel number of the apparatus 100.

The output data forming and controlling portion 523 generates control signals for these processes. The output data forming and controlling portion 523 determines pairs of channels corresponding to the signal CH. In addition, the output data forming and controlling portion 523 determines the number of bits of audio data for each channel corresponding to the bit length data and the audio mode data. Corresponding to the determined result, the output data forming and controlling portion 523 generates control signals.

Reference numeral 510 is a buffer memory that temporarily stores 24-bit audio data that has been converted as one data sequence. The buffer memory 510 arranges the phases of 24-bit audio data of the individual channels.

Reference numeral 511 is an output data forming portion that forms the final output data of the audio data of the apparatus 100. In this example, the output data forming portion 511 sets output audio data to a one-system one-channel format or a one-system two-channel format corresponding to the control signal received from the system controller. In the one-system two-channel format, as shown in FIG. 17B, Ch 1 and Ch 2, Ch 3 and Ch 4, Ch 5 and Ch 6, and Ch 7 and Ch 8 are paired. Reference numerals 512 to 519 are output terminals of output audio data.

When necessary, the output portion 156 performs a muting process. As will be described later, when 24-bit audio data is output, output data of a channel to which low order eight bits of 24-bit audio data should be disabled. Thus, the output portion 157 mutes audio data of a relevant channel corresponding to the control signal of the system controller. The muting process is performed by setting all bits of output data of the relevant channel to [0] data.

When output data has an error that cannot be corrected or audio data has an unnatural rise or an unnatural drop, such a portion can be muted.

FIG. 21 shows an example of the use of the digital video-audio signal recording and reproducing apparatus 100. In FIG. 21, an audio recording encoder 250 is composed of an audio processing portion of the recording side shown in FIG. 3. For example, the audio recording encoder 250 has input terminals 112 and 115, a delaying circuit 113, and an AUX adding circuit 114 for 8 channels each. The audio recording encoder 250 also has particular buffer memories and so forth. Thus, the audio recording encoder 250 can handle input data of four systems—eight channels. Likewise, an audio recording decoder 251 is composed of an audio processing portion of the reproducing side shown in FIG. 4. The audio recording decoder 251 has an AUX separating circuit 153, an interpolating circuit 155, and an output portion 156 for data of four systems. In addition, the audio recording decoder 251 has terminals 154 and 157 for four systems or eight systems. Moreover, the audio recording decoder 251 has buffer memories and so forth. Thus, the audio recording decoder 251 can handle output data for four systems-eight channels.

According to the above-described embodiment, the record medium 212 is a magnetic tape. Alternatively, as the record medium 212, a magneto-optical disc or a hard disk may be used. The amplifier 252 has for example eight D/A converters so that they independently process input data of eight channels. The D/A converters convert audio data of eight channels into analog audio signals. The amplifier 252 amplifies the analog audio signals of eight channels and supplies them to speakers 253, 253, . . . corresponding to the channels.

Input data for four systems of the audio recording encoder 250 corresponds to four paired channels that are a pair of Ch 1 and Ch 2, a pair of Ch 3 and Ch 4, a pair of Ch 5 and Ch 6, and a pair of Ch 7 and Ch 8. 16-bit audio data of two channels is supplied to an input terminal for Ch 1 and Ch 2. Likewise, 16-bit audio data of two channels is supplied to an input terminal for Ch 3 and Ch 4. On the other hand, 24-bit audio data of two channels is supplied to an input terminal for Ch 5 and Ch 6. At this point, input data of Ch 7 paired with Ch 5 and input data of Ch 8 paired with Ch 6 are disabled.

The audio recording encoder 250 stores low order eight bits of input data of Ch 5 of 24-bit audio data to low order eight bits of Ch 7 paired with Ch 5. In addition, the audio recording encoder 250 fills high order eight bits of Ch 7 with [0] data. Likewise, the audio recording encoder 250 stores low order eight bits of input data of Ch 6 to low order eight bits of Ch 8 paired with Ch 6. In addition, the audio recording encoder 250 fills high order eight bits of Ch 8 with [0] data. 24-bit audio data of input data and 16-bit audio data of Ch 1 to Ch 4 are processed as 16-bit data each in the above described manner. The resultant data is recorded on the record medium 212 in a predetermined record format.

Data recorded on the record medium 212 is reproduced by the audio recording decoder 251. Thus, the audio recording decoder 251 determines that data of Ch 1 to Ch 4 is 16-bit audio data corresponding to information stored in AUX0, performs a predetermined process for the data of Ch 1 to Ch 4, and outputs 16-bit audio data of two systems that are a pair of Ch 1 and Ch 2 and a pair of Ch 3 and Ch 4.

On the other hand, the audio recording decoder 251 determines Ch 5 and Ch 7 are a pair of channels and Ch 6 and Ch 8 are a pair of channels and that low order eight bits of Ch 5 and low order eight bits of Ch 6 have been assigned to Ch 7 and Ch. 8, respectively, corresponding to information stored in AUX0. With data of Ch 7 and Ch 8, the audio recording decoder 251 restores 24-bit audio data and outputs it. In addition, the audio recording decoder 251 mutes output data of Ch 7 and Ch 8.

The digital video-audio signal recording and reproducing apparatus 100 can be applied for a surround system having a front left speaker, a front right speaker, a front center speaker, a rear left speaker, and a rear right speaker disposed against a listener so as to accomplish a spatial sound field. In the above-described example, Ch 5 and Ch 6 of 24-bit audio data are assigned to the front left speaker and the front right speaker, respectively. Ch 1 to Ch 4 of 16-bit audio data are assigned to the front center speaker, the rear left speaker, and the rear right speaker. One of Ch 1 to Ch 4 may be assigned to a speaker for multilingual audio data.

When input data and output data have eight channels each, there are five combinations of channels of 16-bit audio data and channels of 24-bit audio data as shown in FIG. 22. The first combination is eight channels of 16-bit audio data.

The second combination is six channels of 16-bit audio data and one channel of 24-bit audio data. The third combination is four channels of 16-bit audio data and two channels of 24-bit audio data (the above-described example). The fourth combination is two channels of 16-bit audio data and three channels of 24-bit audio data. The fifth combination is four channels of 24-bit audio data. When audio data is recorded, the user can select one of the five combinations depending on the desired application. These combinations can be changed for each field interval.

According to the present invention, as described above, 24-bit audio data is separated into low order eight bits and high order 16 bits. The high order 16 bits are assigned to the original channel. The low order. 8 bits are assigned to another channel. The high order eight bits of the other channel to which the low order eight bits have been assigned are filled with [0] data. The original data assigned to the other channel is disabled. The same process as 16-bit audio data is performed for data assigned to the original channel and the other channel.

Thus, according to the present invention, without need to change the number of error correction blocks per edit unit (for example, each field interval), both 16-bit audio data and 24-bit audio data can be processed. In addition, both the record format for 16-bit audio data and the record format for 24-bit audio data can be used on a record medium. Since the AUX data of the audio data contains such information, the process for 16-bit audio data and the process for 24-bit audio data are automatically performed.

In the above-described example, the case that 16-bit audio data and 24-bit audio data that have not been compressed are handled was described. However, the present invention is not limited to such a case. In other words, according to the present invention, audio data that has been compression-encoded corresponding to a particular method can be handled. Likewise, data other than audio data can be handled. In addition, data of which the number of quantizing bits is for example 32 bits rather than 24 bits can be handled.

FIGS. 23A, 23B, 23C, and 23D show examples of other data formats. FIG. 23A shows an example of the format of the above-described 16-bit audio data. In one frame sequence FS, one sample of audio data is composed of two bytes of audio data 1 of eight bits of the middle portion and audio data 2 of eight bits of the upper portion of 24-bit data per channel. FIG. 23B shows an example of which compressed audio data or non-audio data is sent in the same format as FIG. 23A. In FIG. 23B, data having a bit width of 16 bits is composed of data 0 of the middle portion of eight bits and data 1 of the upper portion of eight bits of 24-bit data.

FIG. 23C shows an example of which data having a bit width of 32 bits is composed of a pair of Ch 1 and Ch 3, a pair of Ch 2 and Ch 4, a pair of Ch 5 and Ch 7, or a pair of Ch 6 and Ch 8. When Ch 1 and Ch 3 are paired, data having a bit width of 32 bits is composed of data 0 of the middle portion of eight bits of Ch 1, data 1 of the upper portion of eight bit of Ch 1, data 2 of the middle portion of eight bits of Ch 3, and data 3 of the upper portion of eight bits of Ch 3.

FIG. 23D shows an example of the above-described 24-bit audio data. A pair of Ch 1 and Ch 3, a pair of Ch 2 and Ch 4, a pair of Ch 5 and Ch 7, or a pair of Ch 6 and Ch 8 is used. 24-bit audio data is composed of audio data 0, audio data 1, and audio data 2. 24-bit data of Ch 1 is separated into the upper portion of eight bits, the middle portion of eight bits, and the lower portion of eight bits. The middle portion of eight bits and the upper portion of eight bits are assigned to the lower portion and the upper portion of Ch 1 as the audio data 0 and the audio data 1, respectively. The lower portion of eight bits is assigned to low order eight bits of Ch 3. The high order eight bits of Ch 3 are filled with [0] data. Data of pair channels Ch 3, Ch 4, Ch 7, and Ch 8 is handled as with compressed audio data and non-audio data.

According to the embodiment of the present invention, in the case of 24-bit audio data, low order eight bits of 24-bit audio data of a particular channel are assigned to low order eight bits of a channel paired therewith. Thus, even if audio data of the paired channel is reproduced, a sound is prevented form being reproduced in a large volume level. In such a method, when the reproducing side does not handle 24-bit audio data, the paired channel can be disabled (for example, the paired channel is shortcircuited).

According to the embodiment of the present invention, pairs of channels are fixed. Alternatively, when information of pairs of channels is contained in AUX data or the like, pairs of channels can be properly set.

According to the above-described embodiment, an example of which the present invention is applied for a video cassette recorder that records digital video data and digital audio data was described. However, the present invention is not limited to such an example. Instead, the present invention can be applied for a digital audio apparatus that handles only digital audio data.

According to the present invention, the record medium is not limited to a magnetic tape. Instead, another record medium such as an magneto-optical disc or a hard disk that can record digital audio data can be used. In addition, as well as the record medium, the present invention can be applied for a transmission path such as a communication network.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital signal processing apparatus for inputting digital audio data of at least three channels, converting the digital audio signal into data blocks having a predetermined data amount each, and outputting the data blocks, the bit width per word processed on at least one channel being fixed to B, the number of channels of a signal processing system being N (where N is any integer larger than 3), the digital audio signal of at least one channel being composed of a data sequence whose bit width per word is larger than B, the apparatus comprising:

input means for inputting auxiliary information containing at least bit width information and division information at intervals of a predetermined number of words of the input digital audio signal, the bit width information representing the bit width per word, the division information representing that one word is divided into a plurality of portions, said input means further comprising means for receiving at least three channels with at least one channel having the data sequence with bit width per word being larger than B;

data dividing means for dividing one word of the digital audio data into at least one first division data portion having the bit width B and a second division data portion having a bit width smaller than the bit width B or dividing one word of the digital audio data into a plurality of first division data portions;

channel data forming means for assigning the first division data portion to a predetermined channel of the N channels, adding predetermined bit data to the second division data portion, and assigning the resultant bit added division data portion having the bit width B to a channel other than the predetermined channel;

auxiliary data adding means for adding the auxiliary data to output data of each channel of said channel data forming means at intervals of a predetermined number of words thereof; and data block forming means for converting output data of each channel of said auxiliary data adding means into data blocks having the predetermined data amount each;

whereby said division information includes at least one bit indicating whether or not a current channel is paired with another channel, and a user sets or changes the number of channels (N) of audio data and bit width (B) per sample.

2. The digital signal processing apparatus as set forth in claim 1, wherein one data sequence of the digital audio signal contains digital audio data of a plurality of channels, and wherein the digital signal processing apparatus further comprises:

multiplexing means for assigning each word of the input digital audio signal to a plurality of output channels corresponding to channel identification data of each word of the input digital audio signal, the output data of the plurality of channels of said multiplexing means being supplied to said data dividing means.

3. The digital signal processing apparatus as set forth in claim 1, wherein said channel data forming means places the second division data portion to the low order side (LSB side) of the bit width B corresponding to the auxiliary data, adds the predetermined bit data to the high order side of the bit width B, and forms the bit added division data portion.

4. The digital signal processing apparatus as set forth in claim 1, wherein said channel data forming means assigns the first division data portion and the bit added division data portion to respectively predetermined channels.

5. The digital signal processing apparatus as set forth in claim 1, wherein said channel data forming means outputs the first division data portion and the bit added division data portion to respective channels designated corresponding to a control signal.

6. A digital signal processing method for inputting digital audio data of at least three channels, converting the digital audio signal into data blocks having a predetermined data amount each, and outputting the data blocks, the bit width per word processed on at least one channel being fixed to B, the number of channels of a signal processing system being N (where N is any integer larger than 3), the digital audio signal of at least one channel being composed of a data sequence whose bit width per word is larger than B, the method comprising the steps of:

providing at least three channels for the signal processing system with at least one channel being composed of the data sequence whose bit width per word is larger than B;

inputting auxiliary information containing at least bit width information and division information at intervals of a predetermined number of words of the input digital audio signal, the bit width information representing the bit width per word, the division information representing that one word is divided into a plurality of portions;

dividing one word of the digital audio data into at least one first division data portion having the bit width B and a second division data portion having a bit width smaller than the bit width B or dividing one word of the digital audio data into a plurality of first division data portions;

assigning the first division data portion to a predetermined channel of the N channels, adding predetermined bit data to the second division data portion, and assigning the resultant bit added division data portion having the bit width B to a channel other than the predetermined channel;

adding the auxiliary data to output data of each channel at step (c) at intervals of a predetermined number of words thereof; and converting output data of each channel of said auxiliary data adding means into data blocks having the predetermined data amount each;

whereby said division information includes at least one bit indicating whether or not a current channel is paired with another channel, and a user sets or changes the number of channels (N) of audio data and bit width (B) per sample.

7. The digital signal processing method as set forth in claim 6, wherein one data sequence of the digital audio signal contains digital audio data of a plurality of channels, and wherein the digital signal processing method further comprises the step of:

assigning each word of the input digital audio signal to a plurality of output channels corresponding to channel identification data of each word of the input digital audio signal, the output data of the plurality of channels being supplied for the dividing step.

8. A digital signal recording apparatus for inputting digital audio data of at least three channels, converting the digital audio signal into data blocks having a predetermined data amount each, forming record data with the data blocks, and recording the record data to a record medium, the bit width per word processed on at least one channel being fixed to B, the number of channels of a signal processing system being N (where N is any integer larger than 3), the digital audio signal of at least one channel being composed of a data sequence whose bit width per word is larger than B, the apparatus comprising:

input means for inputting auxiliary information containing at least bit width information and division information at intervals of a predetermined number of words of the input digital audio signal, the bit width information representing the bit width per word, the division information representing that one word is divided into a plurality of portions, said input means further comprising means for receiving at least three channels with at least one channel having the data sequence with bit width per word being larger than B;

data dividing means for dividing one word of the digital audio data into at least one first division data portion having the bit width B and a second division data portion having a bit width smaller than the bit width B or dividing one word of the digital audio data into a plurality of first division data portions;

channel data forming means for assigning the first division data portion to a predetermined channel of the N channels, adding predetermined bit data to the second division data portion, and assigning the resultant bit added division data portion having the bit width B to a channel other than the predetermined channel;

auxiliary data adding means for adding the auxiliary data to output data of each channel of said channel data forming means at intervals of a predetermined number of words thereof;

error correction code encoding means for encoding output data of each channel of said auxiliary data adding means with an error detection code and an error correction code so as to form data blocks having a predetermined data amount each;

first shuffling means for shuffling words of the data blocks in the process for forming the data blocks in said error correction code encoding means;

second shuffling means for arranging the data blocks corresponding to record areas assigned the N channels on the record medium in the process for forming the data blocks in said error correction code encoding means;

record data processing means for processing the data blocks for a proper record format of the record medium; and recording means for recording output data of said record data processing means to the record areas of the record medium;

whereby said division information includes at least one bit indicating whether or not a current channel is paired with another channel, and a user sets or changes the number of channels (N) of audio data and bit width (B) per sample.

9. The digital signal recording apparatus as set forth in claim 8, wherein one data sequence of the digital audio signal contains digital audio data of a plurality of channels, and wherein the digital signal recording apparatus further comprises:

multiplexing means for assigning each word of the input digital audio signal to a plurality of output channels corresponding to channel identification data of each word of the input digital audio signal, the output data of the plurality of channels of said multiplexing means being supplied to said data dividing means.

10. The digital signal recording apparatus as set forth in claim 8, wherein said channel data forming means places the second division data portion to the low order side (LSB side) of the bit width B corresponding to the auxiliary data, adds the predetermined bit data to the high order side of the bit width B, and forms the bit added division data portion.

11. The digital signal recording apparatus as set forth in claim 8, wherein said channel data forming means assigns the first division data portion and the bit added division data portion to respectively predetermined channels.

12. The digital signal recording apparatus as set forth in claim 8, wherein said channel data forming means outputs the first division data portion and the bit added division data portion to respective channels designated corresponding to a control signal.

13. A digital signal reproducing apparatus for reproducing a digital audio signal from a record medium on which a set of digital audio signals of at least three channels is recorded, the bit width per word processed on at least one channel being fixed to B, the number of channels of a signal processing system being N (where N is any integer larger than 3), the digital audio signal of one channel being composed of a data sequence whose bit width per word is larger than B, the record medium having record areas corresponding to the N channels, the digital audio signal being divided into words as data blocks having the bit width B each, the data blocks being processed as record data, the record data being properly recorded in the record areas, the record data containing an error detection code and an error correction and auxiliary data, the auxiliary data containing at least bit width information and division information at intervals of a predetermined number of words of the digital audio signal, the bit width information representing the bit width per word, the division information representing that one word is divided into words having the bit width B each, the apparatus comprising:

providing at least three channels for the signal processing system with at least one channel being composed of the data sequence whose bit width per word is larger than B;

reproducing means for reproducing the record data from the record areas of the record medium;

record data reproduction processing means for processing output data of said reproducing means and reproducing the predetermined data blocks;

error correcting means for detecting and correcting an error of the reproduced data blocks corresponding to the error detection code and the error correction code contained in the reproduced data blocks and for outputting a predetermined data sequence;

deshuffling means for deshuffling the reproduced data blocks and words contained therein in the process for outputting the predetermined data blocks in said error correcting means;

auxiliary data detecting means for detecting the auxiliary data from the predetermined data sequence of the output data of said error correcting means;

word combining means for combining a word having the bit width B in the predetermined data sequence of one of the N channels with a word having the bit width B of the predetermined data sequence of another channel; and output means for forming words each having a bit width larger than the bit width B with the words combined by said word combining means corresponding to the auxiliary data and for outputting a data sequence of the formed words as output data of a predetermined channel;

whereby said division information includes at least one bit indicating whether or not a current channel is paired with another channel, and a user sets or changes the number of channels (N) of audio data and bit width (B) per sample.

14. The digital signal reproducing apparatus as set forth in claim 13, wherein said combining means combines words having the bit width B each of the predetermined data sequence in a predetermined manner corresponding to a control signal.

15. The digital signal reproducing apparatus as set forth in claim 13, wherein said output means assigns channels of the digital audio signal of the output data to a predetermined number of channels corresponding to a control signal.

16. The digital signal reproducing apparatus as set forth in claim 13, wherein said output means mutes output data of a channel selected corresponding to a control signal.

17. A digital video-audio signal recording and reproducing apparatus for encoding each of a digital video signal composed of a data sequence encoded with a variable length code and a digital audio signal composed of a word sequence of which the bit width of each word is larger than bit width B with an error correction code that is a product code, for recording resultant data blocks corresponding to the digital video signal to a record area for the digital video signal formed on a record medium and resultant data blocks corresponding to the digital audio signal to record areas of N channels (where N is any integer larger than 3) formed on the record medium, and for reproducing the digital video signal and the digital audio signal from the record medium, the bit width per word processed on one channel being fixed to B, the number of channels of a signal processing system being N, the apparatus comprising:

data sequence converting means for rearranging the data sequence encoded with the variable length code into a predetermined sequence;

data packing means for combining and dispersing each piece of the data sequence of the output data of said data sequence converting means, forming unit data pieces having a predetermined data length each, and arranging the unit data pieces in a predetermined manner;

video outer code encoding means for encoding output data of said data packing means with an outer code of an error correction code as a product code so as to form video data blocks having a predetermined data amount each;

video shuffling means for arranging the video data blocks that are output from said video outer code encoding means in a predetermined manner;

input means for inputting auxiliary information containing at least bit width information and division information at intervals of a predetermined number of words of the input digital audio signal, the bit width information representing the bit width per word, the division information representing that one word is divided into a plurality of portions, said input means further comprising means for receiving at least three channels with at least one channel having the data sequence with bit width per word being larger than B;

data dividing means for dividing one word of the digital audio data into at least one first division data portion having the bit width B and a second division data portion having a bit width smaller than the bit width B or dividing one word of the digital audio data into a plurality of first division data portions;

channel data forming means for assigning the first division data portion to a predetermined channel of the N channels, adding predetermined bit data to the second division data portion, and assigning the resultant bit added division data portion having the bit width B to a channel other than the predetermined channel;

auxiliary data adding means for adding the auxiliary data to output data of each channel of said channel data forming means at intervals of a predetermined number of words thereof;

audio outer code encoding means for encoding output data of said auxiliary data adding means with an outer code of an error correction code as a product code so as to form audio data blocks having a predetermined data amount each;

audio data shuffling means for arranging the audio data blocks that are output from said audio outer code encoding means in a predetermined manner;

mixing means for mixing output data of said video shuffling means and output data of said audio shuffling means;

identification data adding means for adding identification data to each of the video data blocks and the audio data blocks that are output from said mixing means;

inner code encoding means for encoding the video data blocks and the audio data blocks that are output from said identification data adding means with an inner code of an error correction code as a product code and for outputting record data blocks having a predetermined data amount each;

synchronous pattern adding means for adding a synchronous pattern to each of the record data blocks;

record data processing means for processing the record data blocks with the synchronous patterns to record data in a proper record format of the record medium;

recording means for recording output data of said record data processing means to record areas of the record medium;

reproducing means for reproducing the record data from the record areas of the record medium;

record data reproduction processing means for processing output data of said reproducing means and reproducing the predetermined record data blocks;

inner code decoding means for detecting and correcting an error of the reproduced record data blocks corresponding to the inner code data contained in the record data blocks;

separating means for separating output data of said inner code decoding means into the video data blocks and the audio data blocks corresponding to the identification data contained in output data of said inner code decoding means;

video deshuffling means for deshuffling the video data blocks separated by said separating means in the inverse arrangement of said video shuffling means;

video outer code decoding means for detecting and correcting an error of output data of said video deshuffling means corresponding to the outer code data contained in output data of said video shuffling means;

data depacking means for arranging unit data pieces contained in output data of said video outer code decoding means in the inverse arrangement of said data packing means, performing the inverse processes of the combining and dispersing processes performed by said data packing means, and restoring the original data sequence of the unit data pieces;

data sequence inverse converting means for performing the inverse conversion of the data sequence conversion performed by said data depacking means for the data sequence that is output from said data depacking means so as to restore the original data sequence encoded with the variable length code;

audio deshuffling means for arranging the audio data blocks separated by said separating means in the inverse manner of said audio shuffling means;

audio outer code decoding means for detecting and correcting an error of output data of said audio deshuffling means corresponding to the outer code data contained in output data of said audio deshuffling means;

auxiliary data detecting means for detecting the auxiliary data contained in output data of said audio outer code decoding means;

word combining means for combining the first division data portion of a predetermined channel of the N channels and the bit added division data portion of another channel corresponding to the detected auxiliary data; and output means for forming words each having a bit width larger than the bit width B with the first division data and the bit added division data combined by said word combining means corresponding to the auxiliary data and outputting a data sequence of the words as output data of a predetermined channel;

whereby said division information includes at least one bit indicating whether or not a current channel is paired with another channel, and a user sets or changes the number of channels (N) of audio data and bit width (B) per sample.

18. The digital video-audio signal recording and reproducing apparatus as set forth in claim 17, wherein the auxiliary data is input to said input means at intervals of words of the digital audio signal corresponding to one edit unit of the digital video signal.

19. The digital video-audio signal recording and reproducing apparatus as set forth in claim 17, wherein one data sequence of the digital audio signal contains digital audio data of a plurality of channels, and wherein the digital signal processing apparatus further comprises:

multiplexing means for assigning each word of the input digital audio signal to a plurality of output channels corresponding to channel identification data of each word of the input digital audio signal, the output data of the plurality of channels of said multiplexing means being supplied to said data dividing means.

20. The digital video-audio signal recording and reproducing apparatus as set forth in claim 17, wherein said channel data forming means places the second division data portion to the low order side (LSB side) of the bit width B corresponding to the auxiliary data, adds the predetermined bit data to the high order side of the bit width B, and forms the bit added division data portion.

21. The digital video-audio signal recording and reproducing apparatus as set forth in claim 17, wherein said channel data forming means assigns the first division data portion and the bit added division data portion to respectively predetermined channels.

22. The digital video-audio signal recording and reproducing apparatus as set forth in claim 17, wherein said channel data forming means outputs the first division data portion and the bit added division data portion to respective channels designated corresponding to a control signal.

23. The digital video-audio signal recording and reproducing apparatus as set forth in claim 17, wherein said combining means combines a pair of a channel of the first division data and a channel of the bit added division data corresponding to a control signal.

24. The digital video-audio signal recording and reproducing apparatus as set forth in claim 17, wherein said output means assigns channels of the digital audio signal of the output data to a predetermined number of channels corresponding to a control signal.

25. The digital video-audio signal recording and reproducing apparatus as set forth in claim 17, wherein said output means mutes output data of a channel selected corresponding to a control signal.

* * * * *